US010140956B2

(12) United States Patent
Ueda et al.

(10) Patent No.: US 10,140,956 B2
(45) Date of Patent: Nov. 27, 2018

(54) DISPLAY CONTROL APPARATUS

(71) Applicant: DENSO CORPORATION, Kariya, Aichi-pref. (JP)

(72) Inventors: Yoshihiro Ueda, Kariya (JP); Shigeo Katoh, Kariya (JP); Hitoshi Sugiyama, Anjo (JP)

(73) Assignee: DENSO CORPORATION, Kariya (JP)

( * ) Notice: Subject to any disclaimer, the term of this patent is extended or adjusted under 35 U.S.C. 154(b) by 451 days.

(21) Appl. No.: 14/353,372

(22) PCT Filed: Oct. 23, 2012

(86) PCT No.: PCT/JP2012/006776
§ 371 (c)(1),
(2) Date: Apr. 22, 2014

(87) PCT Pub. No.: WO2013/061577
PCT Pub. Date: May 2, 2013

(65) Prior Publication Data
US 2014/0285398 A1 Sep. 25, 2014

(30) Foreign Application Priority Data

Oct. 24, 2011 (JP) ................. 2011-232987
Aug. 28, 2012 (JP) ................. 2012-187565
Oct. 18, 2012 (JP) ................. 2012-230961

(51) Int. Cl.
G09G 5/14 (2006.01)
G06F 5/00 (2006.01)

(52) U.S. Cl.
CPC .... G09G 5/14 (2013.01); G06F 5/00 (2013.01)

(58) Field of Classification Search
USPC .............. 701/36; 340/425.5; 345/666
See application file for complete search history.

(56) References Cited

U.S. PATENT DOCUMENTS 5,757,268 A * 5/1998 Toffolo ................. B60K 35/00
340/459
6,710,789 B1 3/2004 Sekiguchi et al.
(Continued)

FOREIGN PATENT DOCUMENTS

JP 10-287188 A 10/1998
JP 10-297319 A 11/1998
(Continued)

OTHER PUBLICATIONS

Office Action dated Feb. 24, 2015 issued in corresponding JP patent application No. 2012-271465 (and English translation).
(Continued)

Primary Examiner — Chad M Dicke
(74) Attorney, Agent, or Firm — Posz Law Group, PLC

(57) ABSTRACT

A display control apparatus assigning display images to multiple areas of a vehicle-mounted display is disclosed. The display control apparatus stores area relationship information for each of the areas and image relationship information for each of the display images. Of two display images related to each other, the display control apparatus determines that one display image belongs to a first image group and the other display image belongs to a second image group. The display control apparatus assigns the one display image to the areas by performing a predetermined comparison operation, and then assigns the other display image to the areas based on the area assigned the one display image and the area relationship information.

13 Claims, 29 Drawing Sheets

(56) References Cited

U.S. PATENT DOCUMENTS

| | | | |
|---|---|---|---|
| 7,065,712 | B2 | 6/2006 | Muto et al. |
| 7,136,749 | B2 | 11/2006 | Ichihara et al. |
| 8,548,677 | B2 | 10/2013 | Sugiyama et al. |
| 8,619,092 | B2 | 12/2013 | Yamauchi |
| 2002/0100058 | A1 | 7/2002 | Hirose et al. |
| 2003/0086619 | A1 | 5/2003 | Nagaishi |
| 2005/0179711 | A1 | 8/2005 | Yoshida |
| 2005/0284984 | A1* | 12/2005 | De Lauzun ............ G09G 3/342 244/129.1 |
| 2007/0113175 | A1 | 5/2007 | Iwasaki |
| 2008/0211654 | A1* | 9/2008 | Kasamatsu ............ B60K 35/00 340/461 |
| 2008/0250027 | A1 | 10/2008 | Hirose et al. |
| 2009/0115592 | A1 | 5/2009 | Miake et al. |
| 2010/0117810 | A1* | 5/2010 | Hagiwara ............ G06F 3/0483 340/425.5 |
| 2010/0164698 | A1 | 7/2010 | Tsubooka et al. |
| 2010/0245071 | A1 | 9/2010 | Fujisawa et al. |
| 2011/0035145 | A1* | 2/2011 | Yamasaki ............ G01C 21/36 701/532 |
| 2012/0215404 | A1 | 8/2012 | Sugiyama et al. |

FOREIGN PATENT DOCUMENTS

| | | | |
|---|---|---|---|
| JP | H11-282834 | A | 10/1999 |
| JP | H11-311545 | A | 11/1999 |
| JP | 2004-042683 | A | 2/2004 |
| JP | 2006-285434 | A | 10/2006 |
| JP | 2007-145137 | A | 6/2007 |
| JP | 2007-299325 | A | 11/2007 |
| JP | 2008-301264 | A | 12/2008 |
| JP | 2009-223061 | A | 10/2009 |
| JP | 2010-015300 | A | 1/2010 |
| JP | 2011-055343 | A | 3/2011 |
| JP | 2011-141699 | A | 7/2011 |
| JP | 2011-193040 | A | 9/2011 |
| JP | 2011-204023 | | 10/2011 |
| JP | 2013-137643 | | 7/2013 |
| WO | 2013/061577 | A1 | 2/2013 |
| WO | 2013/061576 | A1 | 5/2013 |

OTHER PUBLICATIONS

Office Action dated Oct. 6, 2015 in the corresponding JP application No. 2012-176322 (with English translation).
U.S. Appl. No. 14/235,187, filed Jan. 27, 2014, Sugiyama et al.
U.S. Appl. No. 14/127,713, filed Dec. 19, 2013, Sugiyama et al.
U.S. Appl. No. 14/353,154, filed Apr. 21, 2014, Ueda et al.
Office Action dated Jan. 27, 2015 in corresponding JP application No. 2012-176322 (with English translation).
Office Action dated May 12, 2015 issued in corresponding JP patent application No. 2012-271465 (and English translation).
Office Action dated Mar. 12, 2015 in the related U.S. Appl. No. 14/235,187 (US 2014/0152433).
Office Action dated Jul. 10, 2015 in the related co-pending U.S. Appl. No. 14/127,713.
International Search Report and Written Opinion of the International Searching Authority dated Nov. 13, 2012 for the related international application No. PCT/JP2012/005079 (with English translation).
Written Opinion of the International Preliminary Examining Authority dated Jun. 25, 2013 for the related international application No. PCT/JP2012/005079 (with English translation).
International Preliminary Examination Report dated Nov. 26, 2013 in the related international application No. PCT/JP2012/005079 (with English translation).
International Search Report of the International Searching Authority dated Nov. 13, 2012 for the related international application No. PCT/JP2012/005080 (with English translation).
Written Opinion of the International Searching Authority dated Nov. 13, 2012 for the related international application No. PCT/JP2012/005080 (with English translation).
Written Reply dated Nov. 13, 2012 for the related international application No. PCT/JP2012/005080 (with English translation).
Written Opinion of the International Preliminary Examination Authority dated Jun. 25, 2013 for the related international application No. PCT/JP2012/005080 (with English translation).
Reply of PCT/JP2012/005079 to Notification dated Nov. 13, 2012 (with English translation).
Amendment of PCT/JP2012/005079 to Notification dated Nov. 13, 2012 (with English translation).
International Search Report of the International Searching Authority dated Nov. 27, 2012 for the related international application No. PCT/JP2012/006775 (with English translation).
Written Opinion of the International Preliminary Examination Authority dated Nov. 27, 2012 for the related international application No. PCT/JP2012/006775 (with English translation).
International Preliminary Examination Report dated Sep. 10, 2013 in the related international application No. PCT/JP2012/006775 (with English translation).
Office Action dated Nov. 12, 2013 in related JP Application No. 2012-187566 (with English Translation).
Office Action dated Dec. 17, 2013 in related JP Application No. 2012-187564 (with English Translation).
Office Action dated Nov. 26, 2013 in related JP Application No. 2012-230960 (with English Translation).
International Search Report dated Nov. 27, 2012 in a corresponding PCT application No. PCT/JP2012/006776 (with English Translation).
Written Opinion dated Nov. 27, 2012 in a corresponding PCT application No. PCT/JP2012/006776 (with English Translation).
Written Reply in PCT/JP2012/005079 (with English translation).
Amendment in PCT/JP2012/005079 (with English translation).
Office Action dated May 7, 2014 in the related JP application No. 2012-187564 (with English translation).
U.S. Appl. No. 14/361,737, filed May 30, 2014, Ueda et al.
International Search Report of the International Searching Authority dated Apr. 9, 2013 in related international application No. PCT/JP2012/008262. (with English translation).
Written Opinion dated Apr. 9, 2013 in related PCT application No. PCT/JP2012/008262. (with English translation).
Office Action dated Nov. 20, 2015 in the corresponding U.S. Appl. No. 14/361,737.

* cited by examiner

FIG. 3
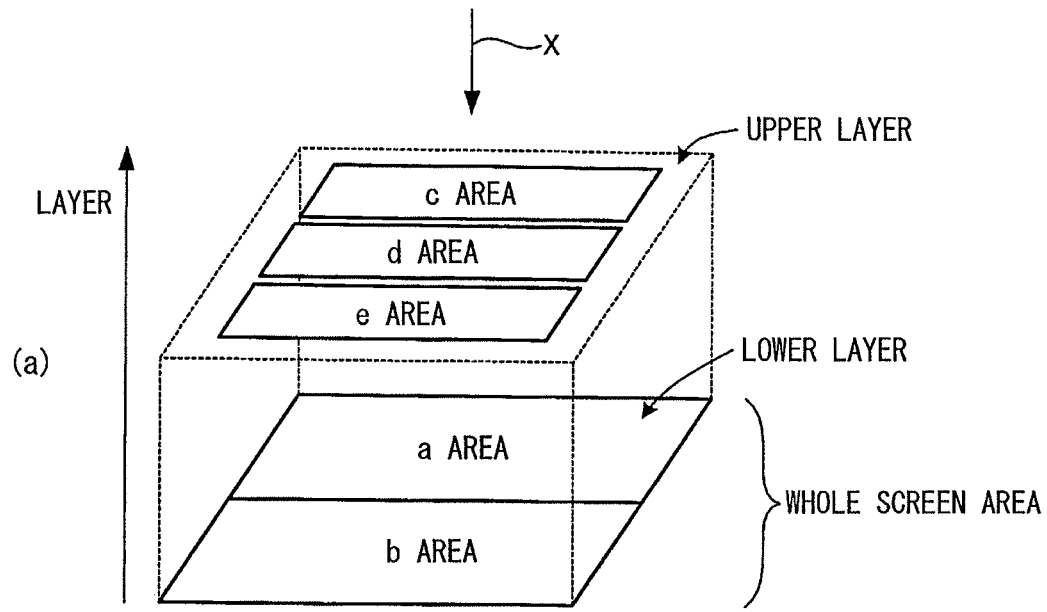
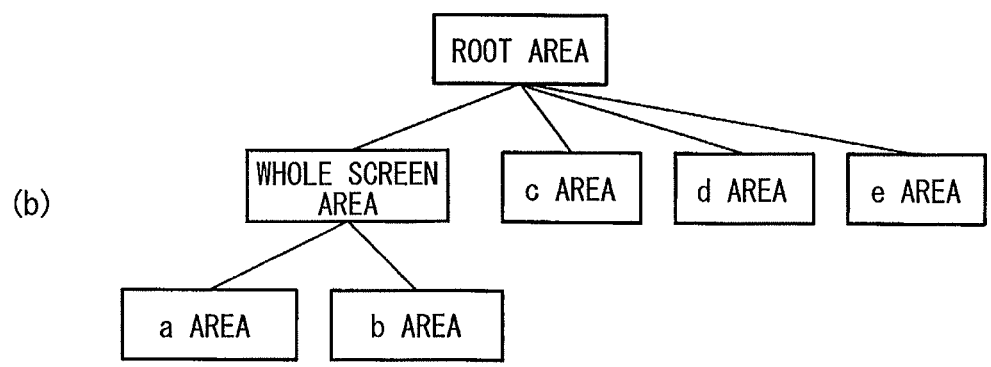
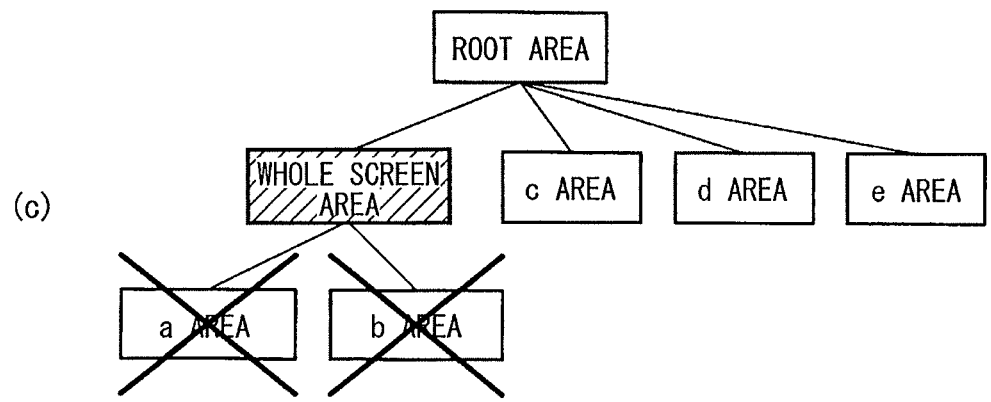

FIG. 9
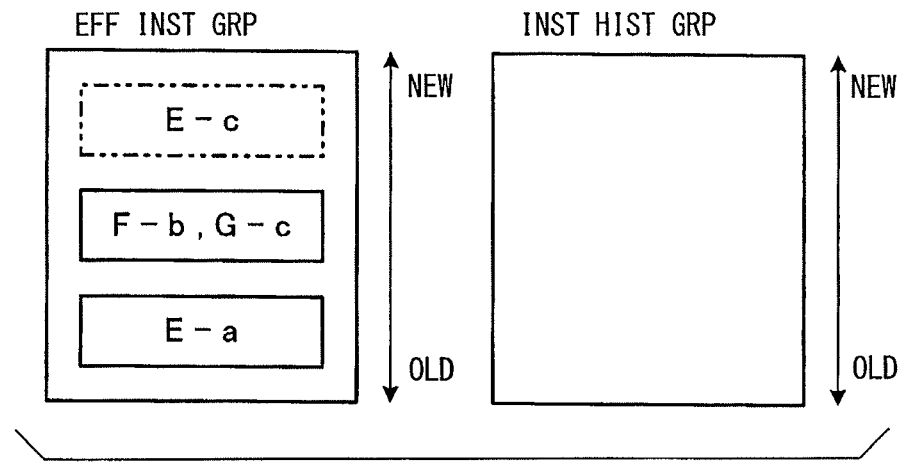
(a)
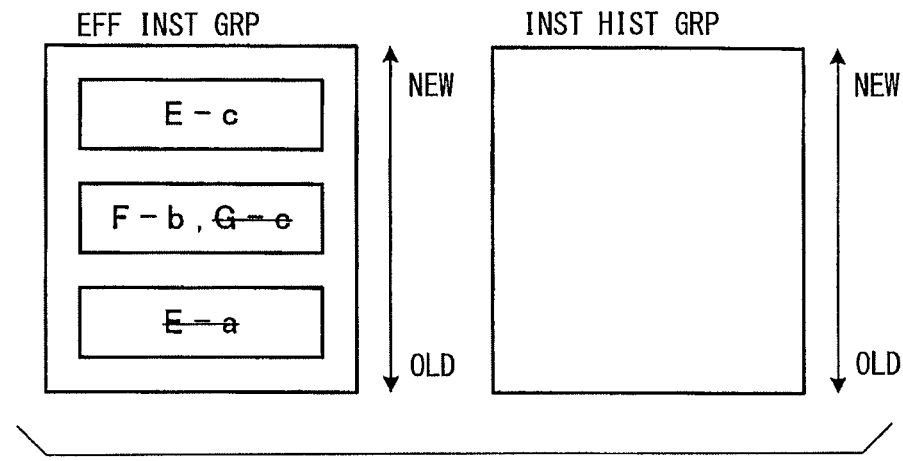
(b)
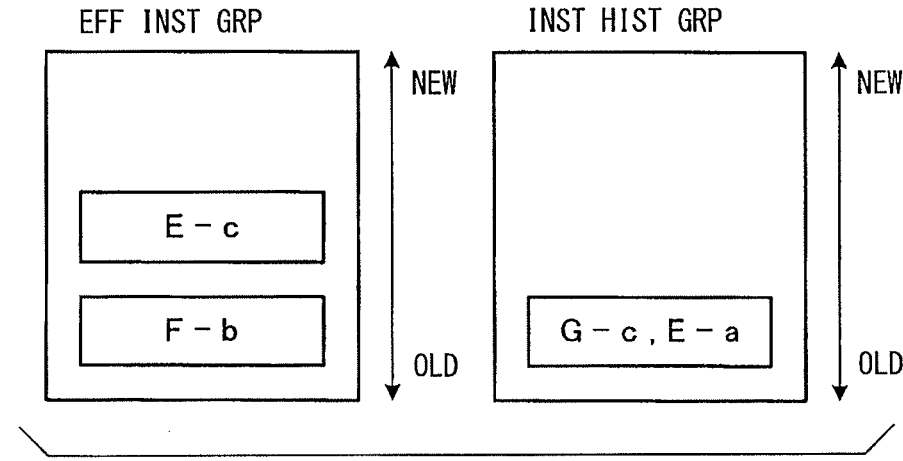
(c)

FIG. 19
(a) 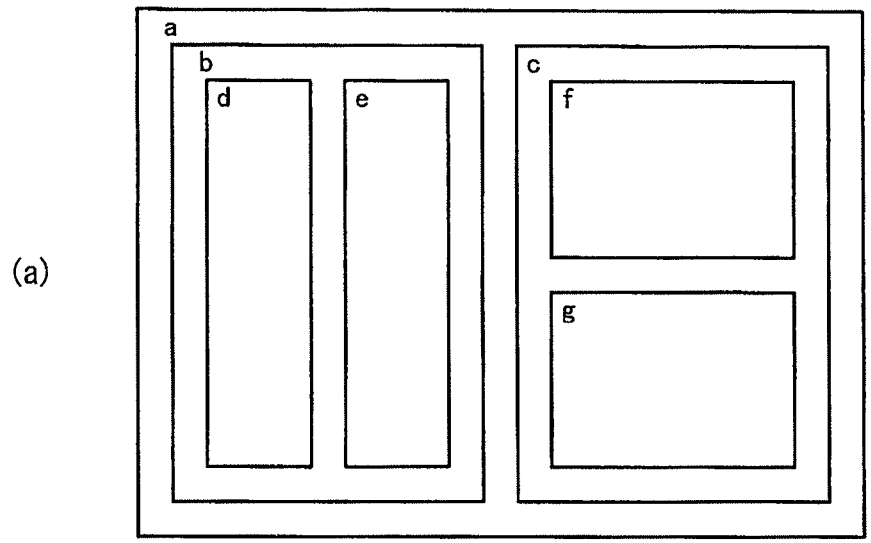
(b) 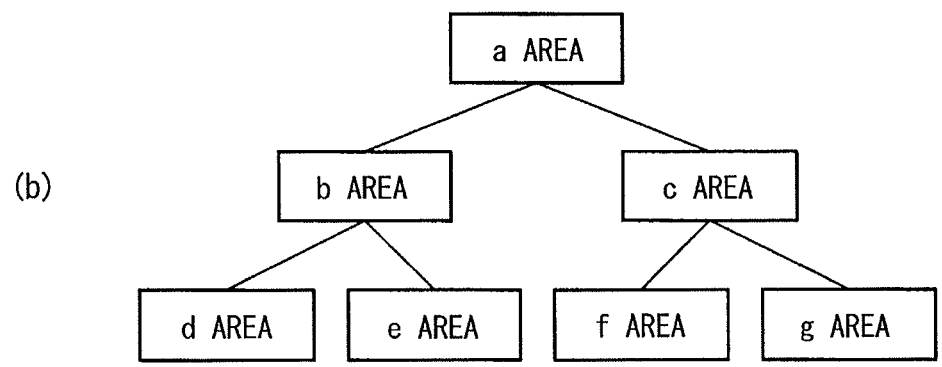
(c) 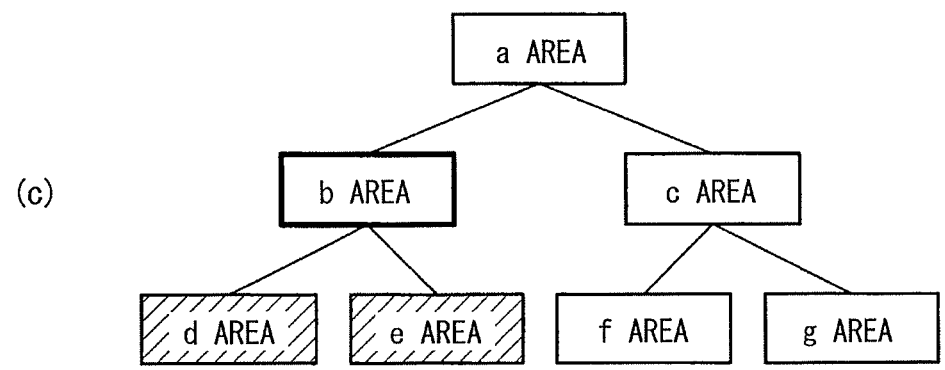

FIG. 20
(a)
| X | Y | & | \| | ^ | / | + |
|---|---|---|---|---|---|---|
| 0 | 0 | 0 | 0 | 0 | 1 | 1 |
| 0 | 1 | 0 | 1 | 1 | 1 | 0 |
| 1 | 0 | 0 | 1 | 1 | 1 | 0 |
| 1 | 1 | 1 | 1 | 0 | 0 | 1 |
(b) 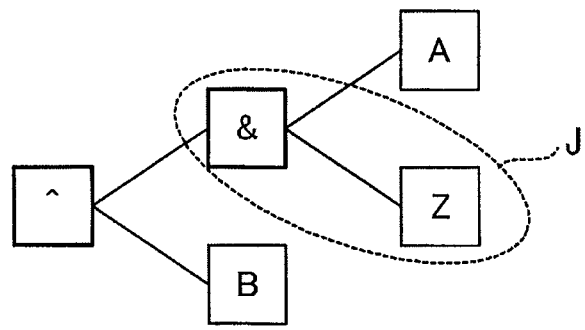
(c) 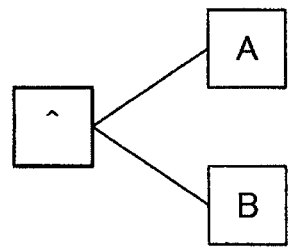
(d) 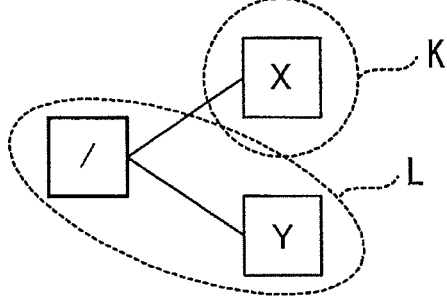

FIG. 25
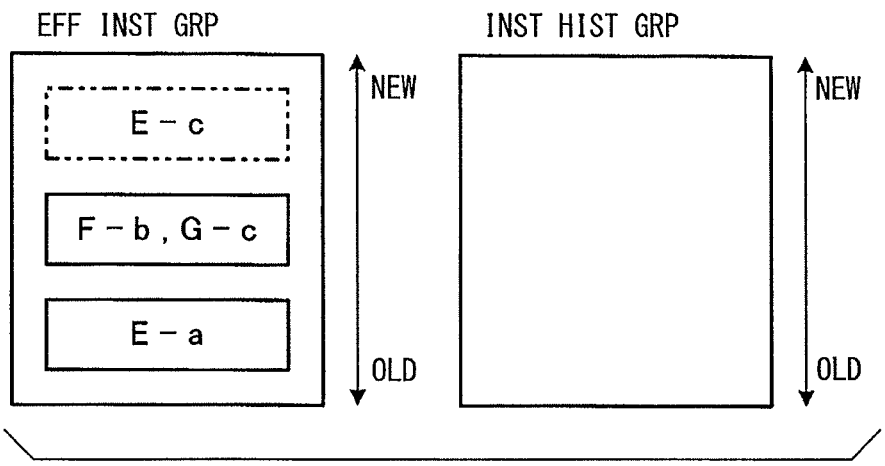
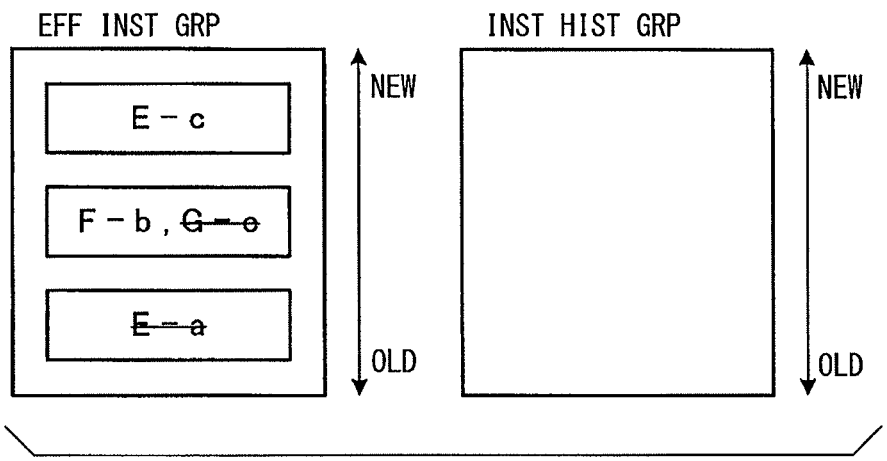
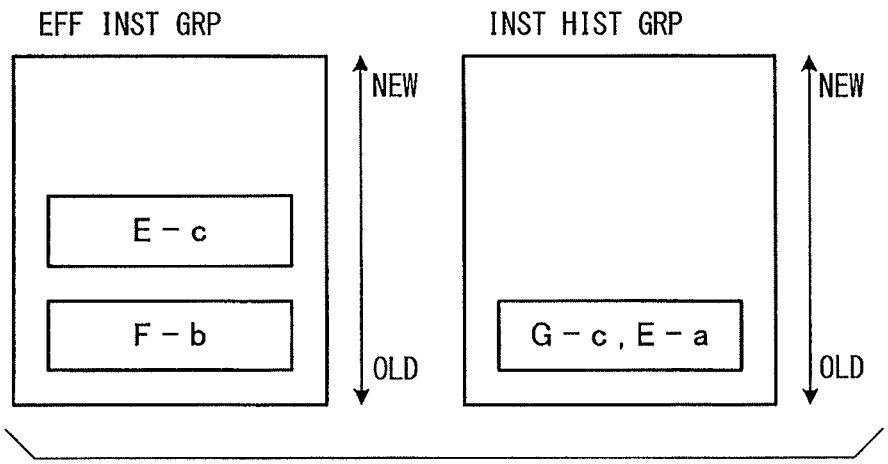

(a)

```
CONTENT: A, B, C, D
CONSTRAIN EQUATION: A ^ B
LIST: ACD, BCD
```

(b)

```
AREA: a, b, c, d
CONSTRAIN EQUATION: a / b
LIST: acd, bcd
```

(c)

DISPLAY CONTROL APPARATUS

CROSS-REFERENCE TO RELATED APPLICATIONS

The present disclosure is a U.S. national stage application of PCT/JP2012/006776 filed on Oct. 23, 2012 and is based on Japanese patent applications No. 2011-232987 filed on Oct. 24, 2011, No. 2012-187565 filed on Aug. 28, 2012, and No. 2012-230961 filed on Oct. 18, 2012, the contents of which are incorporated herein by reference.

TECHNICAL HELD

The present disclosure relates to a technology to display vehicle information with a display apparatus provided in a vehicle compartment, so that a user can easily understand the displayed information.

BACKGROUND ART

Information provided in a vehicle compartment is various. For example, the information includes vehicle states such as a vehicle speed, an engine speed, a shift position, fuel, and water temperature. Additionally, the information includes a map for navigation, air conditioner setting information, and audio information, for example. In recent years, the information such as night views for driving assistance, information about a mobile terminal carried into the vehicle, or the like is provided.

Various display apparatuses are mounted to provide these kinds of information. The display apparatuses include a head-up display and a liquid crystal display to display a map for navigation. Some types of meter panels for displaying vehicle speed and the like use liquid crystal displays to provide varieties of information and are categorized as the display apparatuses.

Because the information (also referred to hereinafter as display image) provided in the above way is increasing, it is practically difficult to preliminarily determine all patterns as to which display image is displayed on which region (also referred to hereinafter as area) of the display apparatuses in what situation. Additionally, when multiple display apparatuses are mounted to a vehicle, it is further difficult to preliminarily determine all the patterns.

A technology described in Patent Document 1 assigns priority to each area and compares the priorities of the areas to automatically determine which display image is displayed in which area. This may enable a determination of the areas for displaying the display images in a manner adapted for an in-vehicle environment without preliminarily determining all the patterns of display image combinations.

However, the technology described in Patent Literature 1 does not suffice in the following point.

Suppose that two display images have a relationship therebetween; for example, a certain display image is supposed to pop up on a different display image. In this case, when the display areas of the display images are determined by comparing the priorities of the areas, there is a possibility that the two display images are displayed in distant areas and that a user has a difficulty in grasping the relationship between the display images

PRIOR ART LITERATURE

Patent Literature

Patent Document 1: Japanese Unexamined Patent Application Publication No. 2009-140488 (corresponding to U.S. Patent Application Publication No. 20100117810)

SUMMARY OF THE INVENTION

The present disclosure is made in view of the foregoing. It is an object of the present disclosure to provide a display control apparatus and a display image assignment method that, even when multiple display images have a relationship, can display the display images in a manner that facilitates user understanding of the relationship between the display images.

According to one example of the present disclosure, a display control apparatus performing a predetermined comparison operation on display images to automatically assign the display images to a plurality of areas configured as display regions on a screen of a display mounted to a vehicle is provided. The display control apparatus comprises an area relationship information storage, a display image relationship information storage, an image determination portion, and a display image assignment portion. The area relationship information storage stores area relationship information for each of the areas, wherein the area relationship information for each area has information on another area that is closely related to the each area. The display image relationship information storage stores image relationship information for each of the display images, wherein the image relationship information for each display image has information on another display image that is closely related to the each display image. The image determination portion determines that, of two display images related to each other, one of the two display images belongs to a first image group and the other belongs to a second image group different from the first image group. The display image assignment portion assigns the display image determined as belonging to the first image group to the areas by performing the predetermined comparison operation, and then assigns the display image determined as belonging to the second image group to the areas based on the area to which the display image determined as belonging to the first image group is assigned, and based on the information stored in the area relationship information storage.

According to another example of the present disclosure, a display image assignment method for performing a predetermined comparison operation to automatically assign a plurality of a display images to a plurality of display areas provided by a display mounted to a vehicle is provided. The display image assignment method comprises: for each of two display image related to each other among the plurality of display images, determining whether the display image belongs to a first group and whether the display image belongs to a second group different from the first group; assigning the display image determined as belonging to the first group to the display areas by performing the comparison operation; and based on a result of the assigning the display image of the first group and based on a relationship of the display areas, assigning the display image determined as belonging to the second group to an display area that is related to the display image belonging to the first group.

In the above display control apparatus and the above display image assignment method performing a predetermined comparison operation on a plurality of display images to automatically assign the display images to areas configured in a vehicular display, when multiple display images have a relationship therebetween, the display images can be displayed in a manner that facilitates user understanding the relationship of the display images.

BRIEF DESCRIPTION OF DRAWINGS

The foregoing and other objects, features and advantages of the disclosure will become more apparent from the detailed description with reference to the accompanying drawings in which:

FIGS. 3(a), 3(b) and 3(c) are explanatory diagrams illustrating a hierarchy data structure of areas in an area information management portion;

FIG. 9(a) is an explanatory diagram illustrating addition of an arrangement instruction to an effective instruction group, and FIG. 9(b) is an explanatory diagram illustrating deletion of arrangement instruction duplication, and FIG. 9(c) is an explanatory diagram illustrating addition of a deleted arrangement instruction to an instruction history group;

FIGS. 19(a), 19(b) and 19(c) are explanatory diagrams illustrating a hierarchy data structure of areas in an area information management portion;

FIGS. 20(a), 20(b), 20(c) and 20(d) are explanatory diagrams illustrating a process with an indispensable exclusive constraint equation formulated with predetermined operators;

FIG. 25(a) is an explanatory diagram illustrating addition of an arrangement instruction to an effective instruction group, and FIG. 25(b) is an explanatory diagram illustrating deletion of arrangement instruction duplication, and FIG. 25(c) is an explanatory diagram illustrating addition of a deleted arrangement instruction to an instruction history group;

FIG. 27(a) is an explanatory diagram illustrating an indispensable exclusive relationship of areas.

MODE FOR CARRYING OUT THE INVENTION

Embodiments of the present disclosure will be described with reference to the accompanying drawings.

(First Embodiment)

Figure 1:
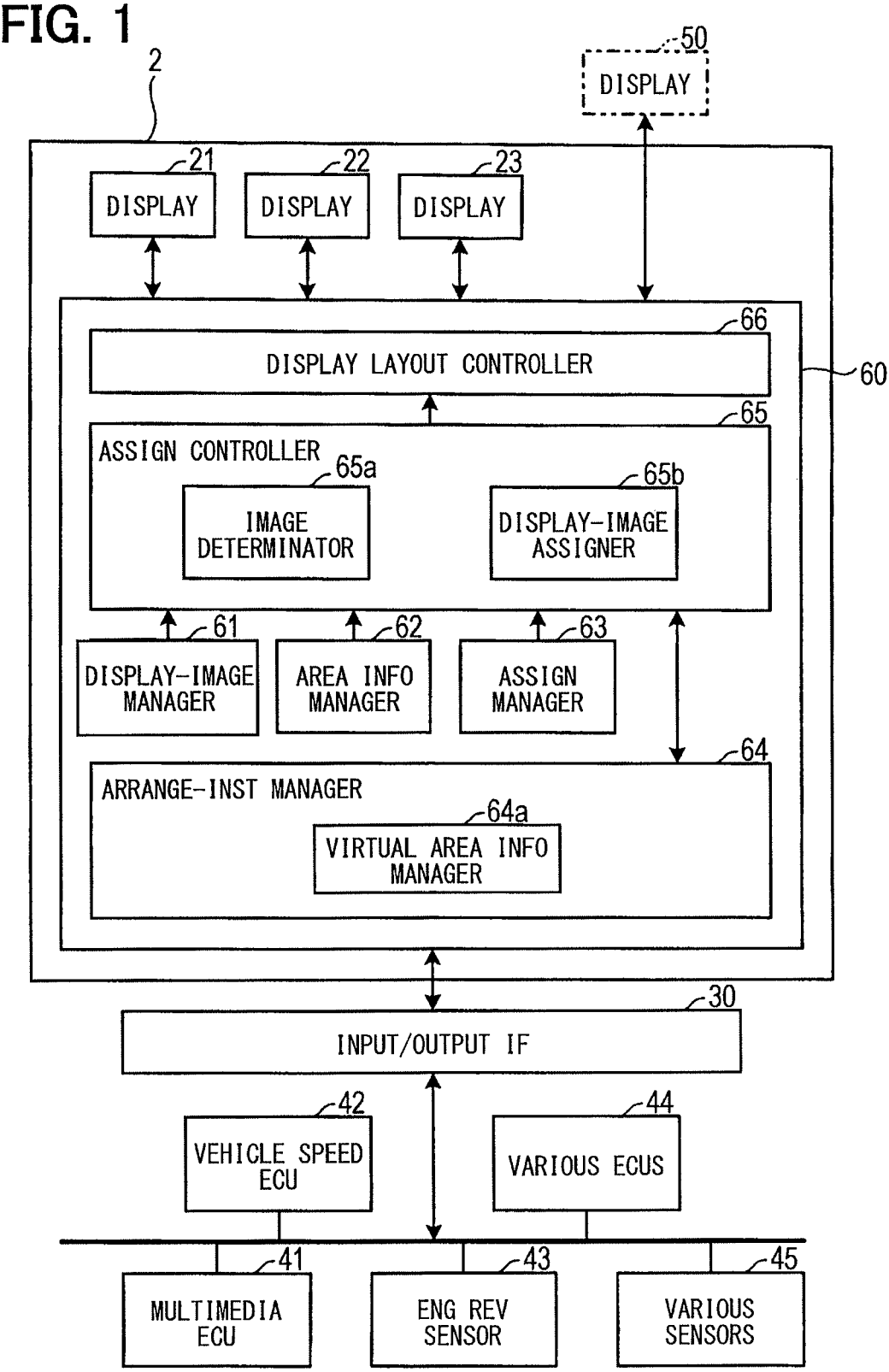
FIG. 1 is a block diagram schematically illustrating a configuration of a display control apparatus of a first embodiment.

FIG. 1 is a block diagram schematically illustrating a configuration of a display control apparatus 2 according to a first embodiment.

The display control apparatus 2 includes a controller 60 as a major component. The controller 60 connects with three displays 21, 22, and 23, and an input/output IF 30. For the purpose of distinction, the three displays 21 to 23 may be termed "first display apparatus 21," "second display apparatus 22," and "third display apparatus 23" as needed in the description below. The display apparatuses 21, 22, 23 may be included in the display control apparatus 1 or may be external with respect to the display control apparatus 2.

The three display apparatuses 21 to 23 are respectively embodied as a head-up display, a meter panel, and a color liquid crystal display apparatus displaying maps for navigation, for example. However, the display apparatuses are not limited thereto.

The input/output IF 30 enables connection to an in-vehicle network (e.g., CAN). Via the input/output IF 30, the display control apparatus 2 is connected to a multimedia ECU 41, a vehicle speed ECU 42, an engine speed sensor 43, various ECUs 44, and various sensors 45. The various ECUs 44 include, for example, a navigation ECU, a hybrid ECU or the like. The various sensors 45 include an outside air temperature sensor to detect the temperature outside the vehicle compartment and a water temperature sensor to detect the coolant temperature.

This configuration enables the display control apparatus 2 to acquire via the network various display images that are based on various kinds of information. The various display images are directed to "audio information" acquired from the multimedia ECU 41, "vehicle speed" acquired from the vehicle speed ECU 42, "engine speed" acquired from the engine speed sensor 43, "map" and "travel assistance information" acquired from the navigation ECU included in the various ECUs 44, "energy flow information" acquired from the hybrid ECU, and "outside air temperature" acquired from the outside air temperature sensor included in the various sensors 45.

The controller 60 is configured as, for example, a microcomputer with a CPU, a ROM, a RAM, I/O, a bus line connecting these components, and the like. The controller 60 includes a display image management portion 61, an area information management portion 62, an assignment management portion 63, an arrangement instruction management portion 64, an assignment control portion 65, and a display layout control portion 66.

Figure 2:
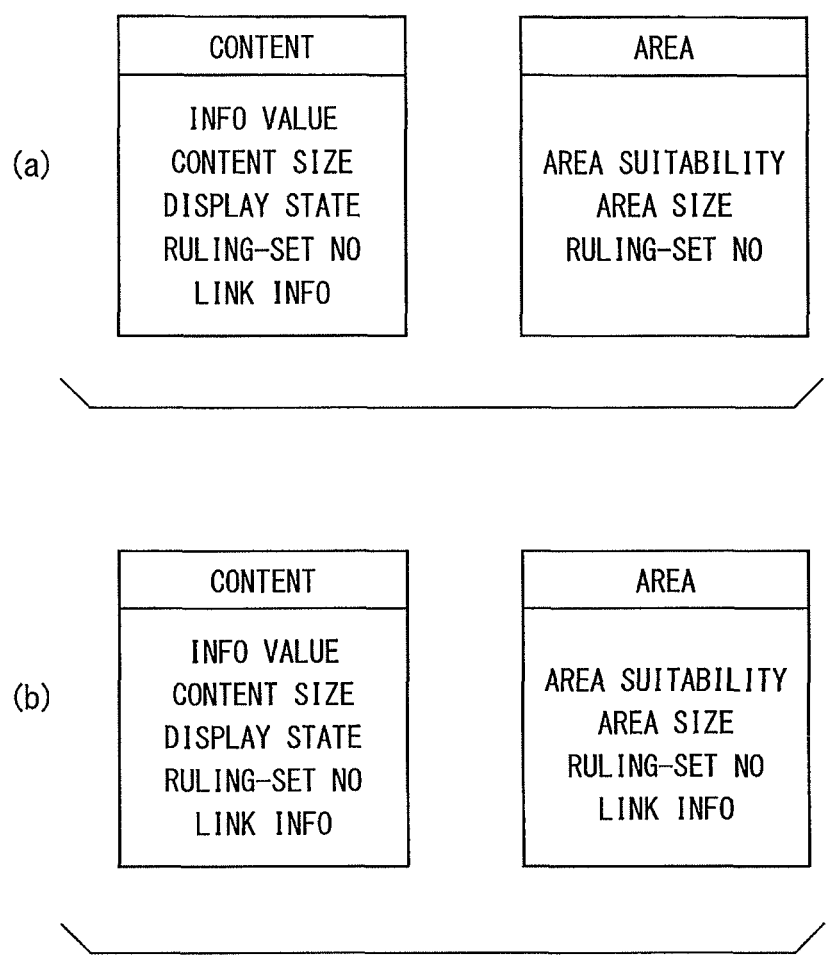
FIGS. 2(a) and 2(b) are explanatory diagrams illustrating attributes associated with contents and areas.

The display image management portion 61 has a function to manage various display images including those belonging to different categories. As illustrated in FIG. 2(*a*), the display image management portion 61 includes a storage storing a display image in association with five attributes (parameters), which are "information value", "content size", "display state", "ruling-set number" and "link information".

The information value of the present embodiment denotes the value of a display image for each target viewer. Specifically, the information value indicates how a display image is useful for a specific target viewer in comparison with another target viewer. In the present embodiment, target viewers include a driver, a front-seat passenger, and a rear-seat passenger. That is, the value of a display image varies depending on target viewers. For example, the display images such as "vehicle speed" and "engine speed" are very significant for the driver. Therefore, each display image has three types of value, the information value (driver), the information value (front-seat passenger), and the information value (rear-seat passenger). The present embodiment assumes that the information value is stored as a numeric value of "0" or larger.

The content size concerns size of an area needed to display a display image. The content size is represented as the number of vertical and horizontal pixels, for example.

The display state is flag information indicating whether the display image is a display target or not. The display state is set to be "active state" indicating that the display image is a display target or "inactive state" indicating that the display image is not a display target.

Specifically, each content switches between "activate state" and "inactivate state" depending on vehicle situations or user operations. For example, when the gear shift range is R, the display image for "back monitor" based on information captured by a rear view camera is in "active state". When the gear shift range is other than "R" the display image for "back monitor" is in "inactive state". For example, when a user turns on an audio switch, the display image for "audio information" is put in the "activate state". When a user turns off the audio switch, the display image for "audio information" is put in "inactive state".

The ruling-set numbers are provided to determine that, of display images related to each other, one display image belongs to a first image group and another display image belongs to a second image group different than the first image group. Introduction of the concept of ruling-set enables to preferentially assign display images to areas on a group-to-group basis. In the present embodiment, the ruling-set number is either 1 or 2.

The link information is image relationship information between multiple images that associates an image with other image(s) having a close relationship with the image.

Explanation returns to FIG. 1. The area information management portion 62 manages multiple areas as display regions. The areas according to the embodiment are provided in screens of the three display apparatuses 21 through 23. The area information management portion 62 similarly manages the areas for the three display apparatuses 21 through 23. For example, areas of the first display apparatus 21 and those of the second display apparatus 22 are equally managed. As illustrated in FIG. 2(*a*), the area information management portion 62 includes a storage that stores three attributes (parameters) while associating them with each area. The three attributes are "area suitability," "area size," and "ruling-set number". It is noted that the area information management portion 62 is an example of area relationship information storage.

The area suitability is used as an index indicating viewability for each target viewer. As described above, target viewers include a driver, a front-seat passenger, and a rear-seat passenger. That is, the area suitability varies from target viewer to target viewer. For example, areas in a meter panel have the large area suitability for the driver. Areas in a liquid crystal display apparatus for displaying maps for navigation have the large area suitability for the driver and the front-seat passenger. Each area has three suitabilities, which are area suitability (driver), area suitability (front-seat passenger), and area suitability (rear-seat passenger). In the present embodiment, the area suitability has ten grades "1" through "10" but is not limited thereto.

The area size concerns size of an area. Similarly to the content size, the area size is represented as the number of vertical and horizontal pixels, for example.

As described above, the ruling-set numbers are provided to preferentially assign display images to areas by a ruling-set-to-ruling-set basis and are assigned to the corresponding display images.

The area information management portion 62 manages areas as hierarchical data structure, wherein the areas are configured in the first display apparatus 21 through the third display apparatus 23. In other words, the area information management portion 62 may use a display screen of each display apparatus 21 through 23 as a single area or as divided display areas. For this purpose, the area information management portion 62 includes a storage (storage portion) to store variables indicating hierarchical structure relationship among areas. The hierarchical data structure includes a layer structure. Now, on assumption that the third display apparatus 23 is a color liquid crystal display apparatus for displaying a navigation image or the like, the hierarchical data structure will be described.

As illustrated in FIG. 3(a), the display areas of the third display apparatus 23 are configured with a lower layer and an upper layer. The areas a and b belong to the lower layer. The areas c, d, e belong to the upper layer. Thus, when viewed in the direction denoted by the arrow X, the display image assigned to the upper layer is superimposed on the display image assigned to the lower layer.

Hierarchy data is illustrated in FIG. 3(b). Specifically, a whole screen area using a whole screen is configured, and additionally, an area a and an area b are configured, wherein the area a and the area b are vertically-divided two areas of the whole screen. In the above, the whole screen area is managed as a highest hierarchy area. The area a and the area b are managed as next-lower-hierarchy areas. The areas c to a are different in layer from the whole screen area and are in the same hierarchy as the whole screen area.

Figure 4:
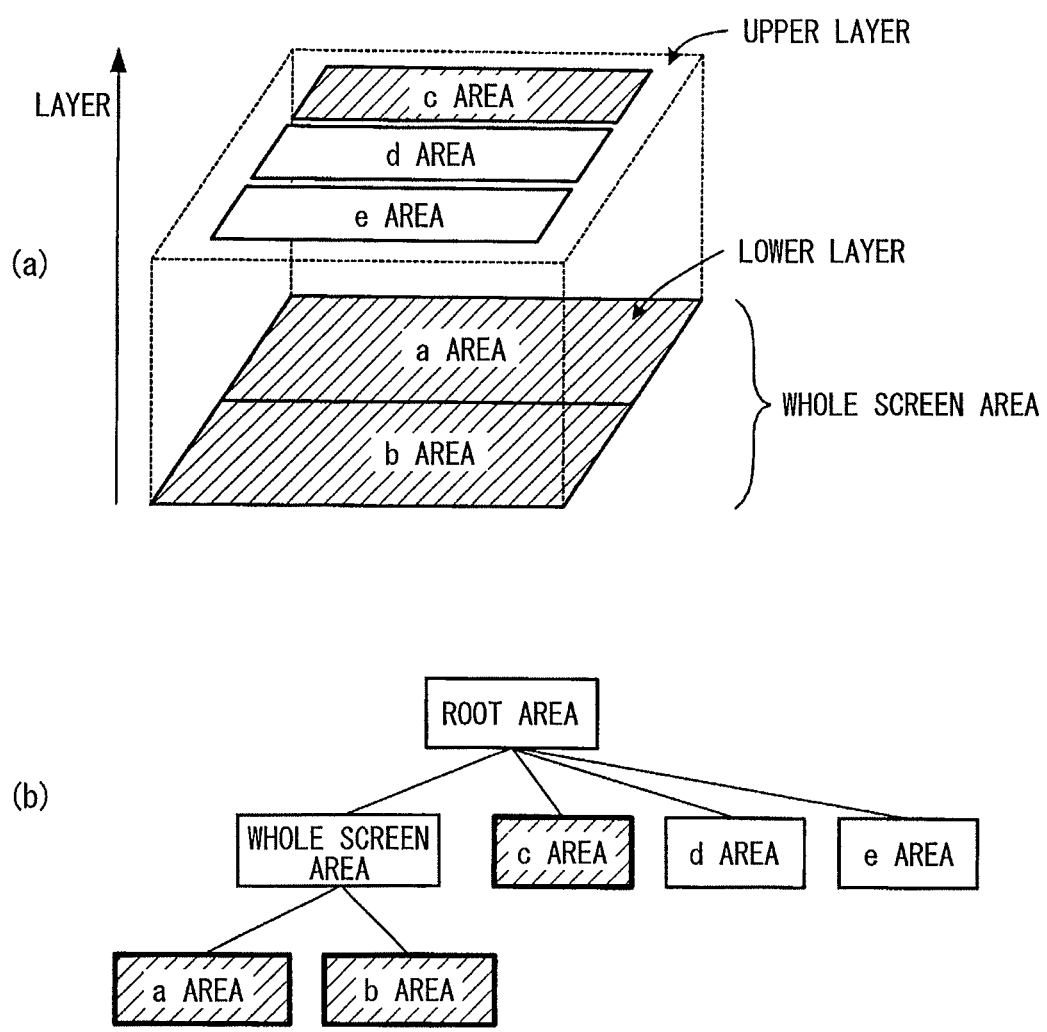
FIGS. 4(a) and 4(b) are explanatory diagrams illustrating a superimposing display in a hierarchy data structure of areas.

For example, when a display image is assigned to a whole screen area as illustrated in FIG. 3(c), the areas a and b belonging to the lower hierarchy are unavailable, as illustrated by X symbols in FIG. 3(c). As illustrated in FIG. 3(b), the areas a to e are different in layer from the whole screen area and belong to the same hierarchy as the whole screen area. Thus, even when the whole screen area (or the area a or b) is used, another display image is assignable to the areas a to a. For example, as illustrated in FIG. 4(a), display images are assignable to the areas a and b, and additionally, a display image is assignable to the area c. The hierarchical data structure in this case is schematically illustrated as a hatched portion of FIG. 4(b)

Explanation returns to FIG. 1. The assignment management portion 63 stores assignment information for assigning a predetermined display image to a predetermined area. The assignment information for assigning a predetermined display image to a predetermined area describes a correspondence relationship between the predetermined display image and the predetermined area.

The arrangement instruction management portion 64 stores an arrangement instruction which is provided by a system and an arrangement instruction which is based on user operations. The arrangement instruction management portion 64 manages the arrangement instructions, which are dynamical and thus different than the assignment information stored in the assignment management portion 63. The arrangement instructions provided by a system are generated by requests of the system and are directed to "back monitor", "map" and "travel assistant information" for navigation, and the like. The arrangement instructions based on user operations are generated by user operations and directed to "audio information", "energy flow information" of a hybrid vehicle, and the like.

For example, when the gear shift range is put in "R, an instruction to arrange the display image "back monitor" in the area displaying the navigation map is issued as an arrangement instruction provided by a system. When a user turns on an audio switch, an instruction to arrange the display image "audio information" in the area displaying the navigation map is issued as an arrangement instruction that is based on a user operation. The arrangement instructions based on user operations include an instruction to move a displayed image to another area by a drag operation or the like.

Specifically, the arrangement instructions described herein include an instruction to arrange a specific display image to a specific area in place of a display image originally displayed on the specific area. This is a sort of "late-come-win arrangement".

In the present embodiment, based on the information stored in the display image management portion 61, the area information management portion 62, the assignment management portion 63 and the arrangement instruction management portion 64, the assignment control portion 65 first assigns a display image to an area based on the arrangement instruction of the arrangement instruction management portion 64. Thereafter, as to a display image having no arrangement instruction, the assignment control portion 65 calculates an evaluation value of the display image with respect to an area to assign the display image to the area. Based on the assignment of the display images to the areas by the assignment control portion 65, the display layout control portion 66 displays the display images.

As described later, in order to achieve arranging display images by taking into account a relationship between the display images, the present embodiment manages areas by associating the areas with the ruling-set numbers corresponding to the ruling-set. As described above, the display image and the area are associated with either one of the ruling-set number 1 and 2, and the assignment is performed on a ruling-set-to-ruling-set basis. In the above, the assignment is performed in such an order that the ruling-set including the display image to be preferentially assigned to an area is assigned first. Specifically, the assignment is performed in the following order: the ruling-set number "1"→the ruling-set number "2".

Figure 5:
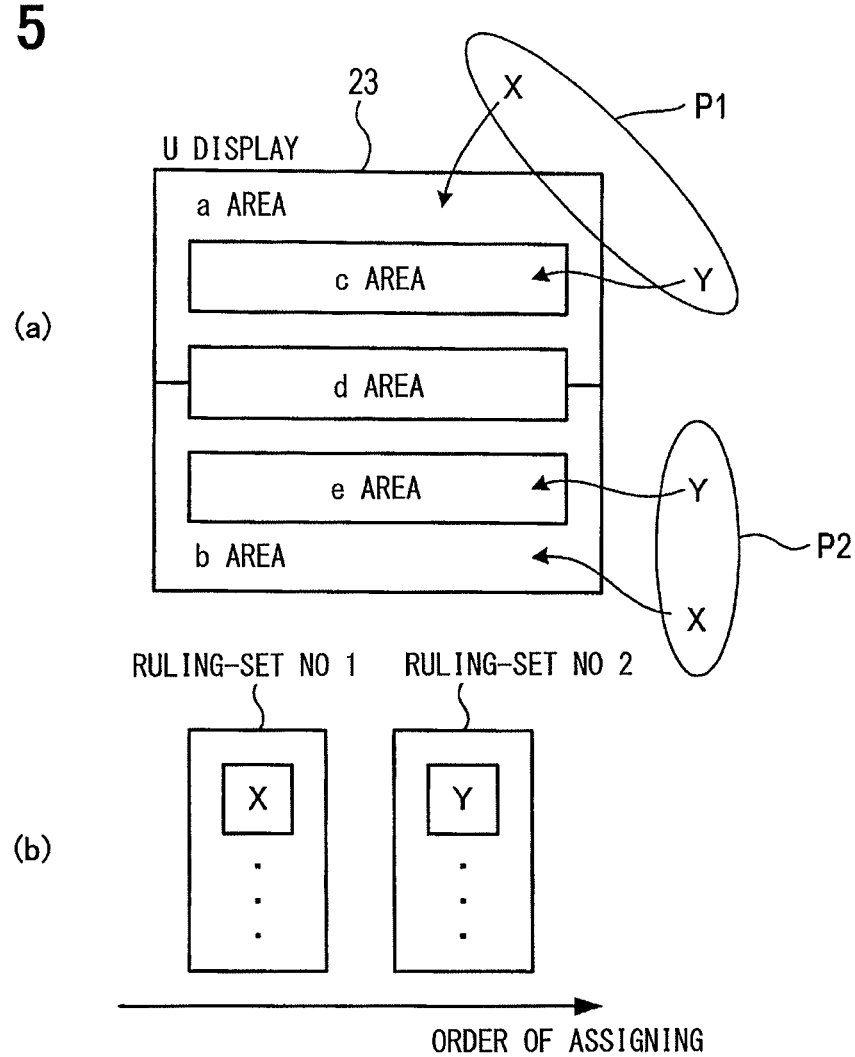
FIGS. 5(a), 5(b) and 5(c) are explanatory diagrams illustrating a ruling-set for achieving an instruction to arrange in a virtual area.

For example, suppose that there are a display image X and a display image Y relating to the display image X, and that a request to superimpose the display image Y on the display image X arises. For example, as illustrated in FIG. 5(a), when the display image X is arranged on the area a of the third display apparatus 23, the display image Y is displayed on the area c. This is a combination denoted by the symbol P1. When the display image X is arranged on the area b, the display image Y is displayed on the area e. This is a combination denoted by the symbol P2.

In the above cases, only after it is determined whether to arrange the display image X on the area a or the area b, the area of the display image Y is determined. Therefore, as illustrated in FIG. 5(b), the assignment is performed in the following order: the ruling-set number "1" associated with the display image X and the ruling-set number "2" associated with the display image Y.

It is conceivable that the above described arrangement instruction is issued to the display image Y. Specifically, the pop up of the display image Y on the display image X is issued. In this case, until the area of the display image X is determined, the arrangement instruction to arrange the display image Y on an area cannot be executed.

In view of this, the present embodiment employs a concept of virtual area. Specifically, as illustrated in FIG. 5(c), the arrangement instruction to arrange the display image Y on a virtual area is issued. Then, after the display image X is assigned, a process of associating the virtual area with the area c or e is performed.

Specifically, to determine the area of the display image Y associated with the ruling-set number "2", the present embodiment reads out the link information associated with the display image Y, and specifies the area on which the display image X is arranged. Then, the area for the display image Y is determined based on the information on another area having a close relationship with the area. The link information (area relationship information) between areas is stored in a virtual area information management portion 64a of the arrangement instruction management portion 64. The virtual area information management portion 64a is an example of area relationship information storage.

Next, a display control process will be described based on flowcharts of FIGS. 6 and 7. The display control process is performed by, for example, the controller 60. In the description below, the information value and the area suitability are collectively referred to as "value". The content size and the area size are collectively referred to as "size" on an as-needed basis.

First, at S100, the arrangement instruction is acquired. As described above, this arrangement instruction is the arrangement instruction which is provided by a system or which is based on the user operation, and which is managed by the arrangement instruction management portion 64.

At S110, the arrangement instruction is added to an effective instruction group. In the present embodiment, the effective instruction group and an instruction history group are configured. The effective instruction group is a group of arrangement instructions which are stored in chronological order. The instruction history group indicates, in chronological order, a history of deleting arrangement instructions from the effective instruction group after storing the arrangement instructions in the effective instruction group. For example, when an arrangement instruction "E-c" is acquired at S100, the arrangement instruction "E-c" is added to the effective instruction group, as illustrated by two-dotted-dashed line in FIG. 9(a).

At S120, the display image is determined based on the ruling-set number. This process sorts the display image into the first image group or the second image group based on the ruling-set number. Because of this, the display image having the ruling-set number "1" (the display image in the first image group) is arranged on the area having the ruling-set number "1" first.

At subsequent S130, the duplicated instruction is deleted and added to the instruction history group. In this process, when the effective instruction group contains the arrangement instructions with the duplicated display image or area, the duplicated arrangement instruction is deleted. Then, the duplicated arrangement instruction is added to the instruction history group.

In FIG. 9 for example, when the arrangement instruction "E-c" is added as illustrated in FIG. 9(a), the arrangement instruction "G-c" having the duplicated area and the arrangement instruction "E-a" having the duplicated display image are deleted as illustrated in FIG. 9(b). Them, as illustrated in FIG. 9(c), the arrangement instructions "G-c" and "E-a" are stored in the instruction history group.

At S140, the display images are assigned to the areas based on the effective instruction group. This achieves "late-come-win arrangement" in the arrangement of the display image to the area.

At subsequent S150, it is determined whether or not the instruction history group contains an arrangement instruction that is not duplicated with the effective instruction group. It happens that when a new arrangement instruction is added to the effective instruction group, the arrangement instruction deleted in past may not be duplicated with the effective instruction group. When the instruction history group contains a non-duplicated arrangement instruction (S150: YES), a display image is arranged on an area based on the arrangement instruction in the instruction history group at S160, and the process proceeds to S170. When the instruction history group does not contain a non-duplicated arrangement instruction (S150: NO), the process proceeds to S170 without execution of S160.

Figure 10:
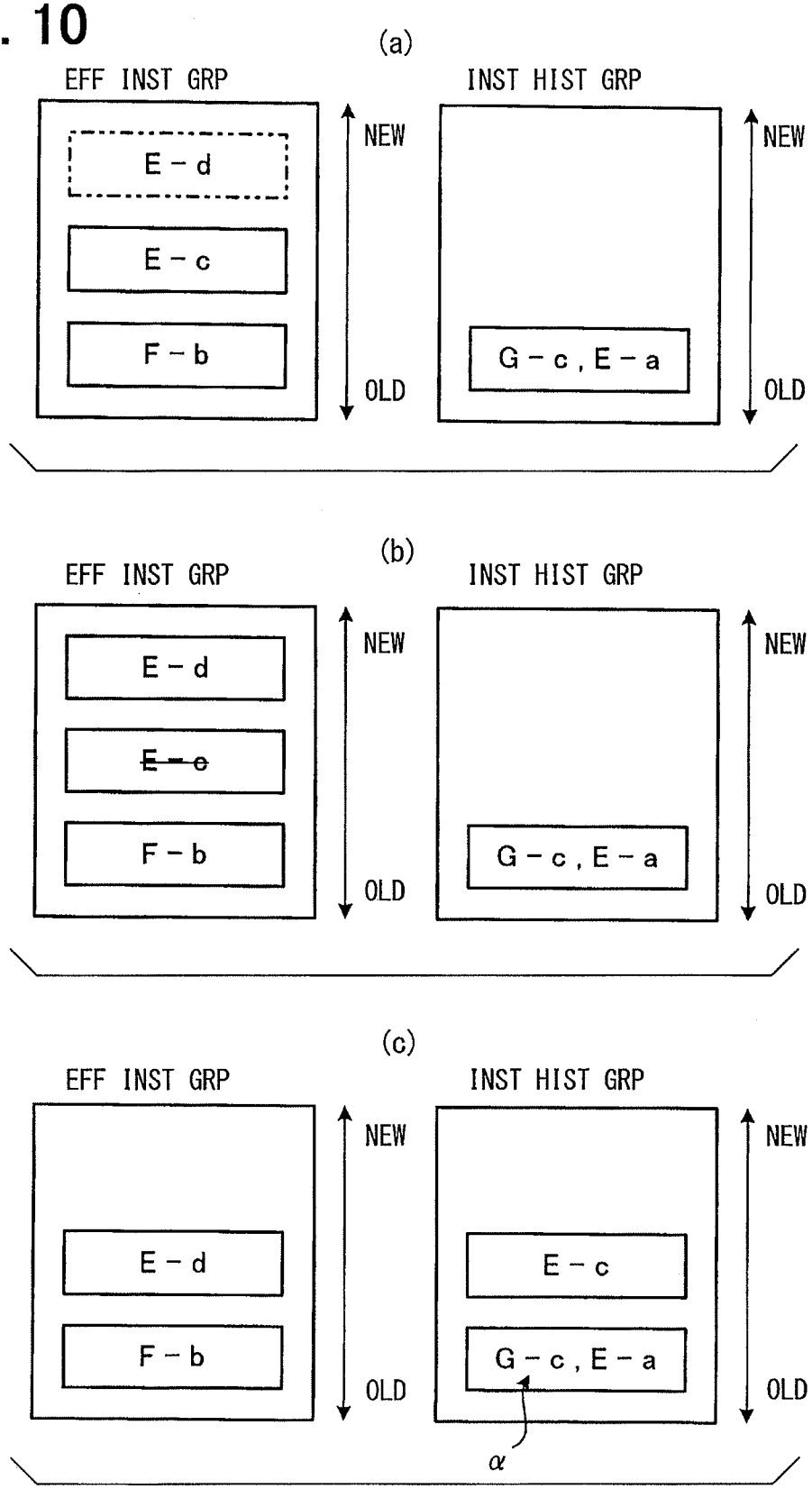
FIG. 10(a) is an explanatory diagram illustrating addition of an arrangement instruction to an effective instruction group.
FIG. 10(b) is an explanatory diagram illustrating deletion of arrangement instruction duplication.
FIG. 10(c) is an explanatory diagram illustrating addition of a deleted arrangement instruction to an instruction history group.

For example, as illustrated in FIG. 10(a), suppose that an arrangement instruction "E-d" is newly added to the effective instruction group in a situation where arrangement instructions "G-c" and "E-a" are stored in the instruction history group. In this case, the duplicated arrangement instruction "E-c" is deleted as illustrated in FIG. 10(b) and the arrangement instruction "E-c" is added to the instruction history group as illustrated in FIG. 10(c) (S130 in FIG. 6). As a result, the arrangement instruction "G-c" (denoted by the symbol "α") in the instruction history group becomes not duplicated with the arrangement instructions in the effective instruction group (S150: YES), and the display image G is assigned to the area c based on the arrangement instruction "G-c" (S160).

At S170, a display image list is generated. This process generates a list of display images that have not yet been assigned to areas until S160. Specifically, the display images having "active state" as their attributes are extracted and sorted in a descending order of information value. For example, suppose that display images X, Y, Z, and W are present and their information value is X>Y>Z>W. In this case, when the display images X Z, W are in the active state, the display image list "X→Z→W" is generated. Now, it is assumed here that the total number of display images stored is N.

At subsequent S180, a variable n indicating the display image is initialized to "1." As the variable n is incremented, the processing is performed in the following order: the first display image among the display images having the ruling-set number "1"→the second display image among the display images having the ruling-set number "1"→the third display image among the display images having the ruling-set number "1" and so on.

At S190, an area search is made. This process searches for all areas to which display images have not yet been assigned.

Figure 7:
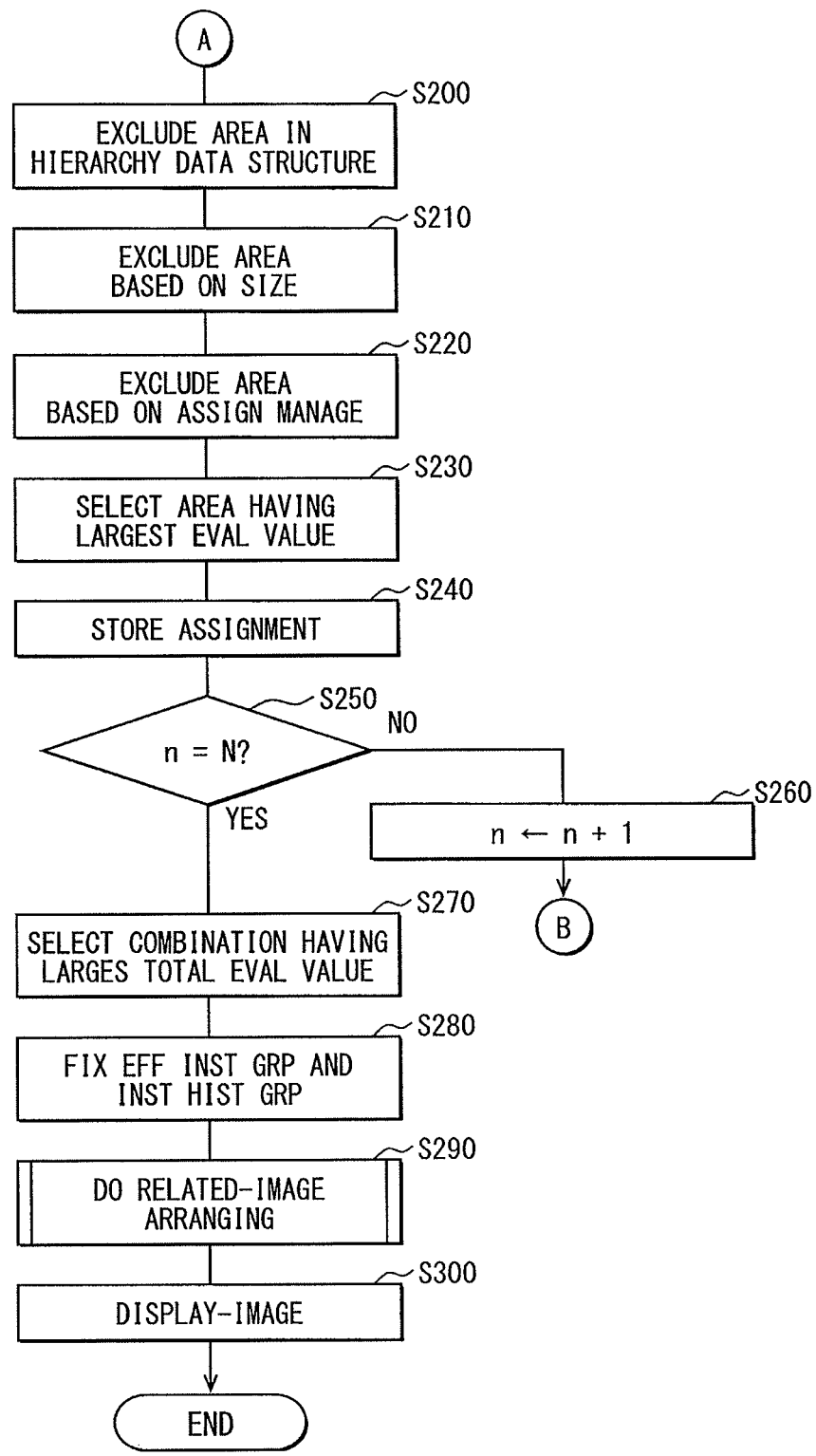
FIG. 7 is a flowchart illustrating the latter half of the display control process.

At S200 in FIG. 7, an area is excluded based on the hierarchical data structure. This process excludes a certain area that is assigned no display image but a display image is assigned to an area located higher than the certain area in the hierarchical data structure. As illustrated in FIG. 3(c), for example, when a display image is assigned to the area b, the areas d and e are excluded.

At S210, an area is excluded based on the content size and the area size. The process excludes an area whose area size is smaller than the content size of a display image to be assigned.

At S220, an area is excluded based on assignment management. Specifically, this process excludes an area having no correspondence relationship with the display image, based on the correspondence relationship stored in the assignment management portion 63.

At S230, evaluation values are calculated and an area having the largest evaluation value is selected. This process uses a predetermined calculation expression to calculate evaluation values and selects an area having the largest evaluation value.

Specifically, the evaluation value includes a driver evaluation value (DE), a front-seat passenger evaluation value (AE), and a rear-seat passenger evaluation value (RE). To simplify equations, the driver is expressed as "D," the front-seat passenger as "A," and the rear-seat passenger as "R." The present embodiment defines the evaluation values as follows.

$$DE = K[D] \times \text{information value } [D] \times \text{area suitability } [D]$$

$$AE = K[A] \times \text{information value } [A] \times \text{area suitability } [A]$$

$$RE = K[R] \times \text{information value } [R] \times \text{area suitability } [R]$$

In these equations, K[D], K[A], and K[R] denote the presence of a driver, the presence of a front-seat passenger, and the presence of a rear-seat passenger, respectively, and are set to "1" when they are aboard or to "0" otherwise.

The evaluation value to be obtained is expressed as follows.

evaluation value=DE+AE+RE

At S240, assignment of the display image to the area having the largest evaluation value provided at S230 is stored.

At S250, it is determined whether the variable n equals the number N of display images. This process determines whether all of display images associated with the ruling-set number "1" have been processed already. If the determination results in n=N (S250: YES), the process proceeds to S270. If the determination results in n≠N (S250: NO), an unprocessed display image remains. The process increments the variable n at S260 and repeats from S190 in FIG. 6.

At S270, based on total of evaluation values in each combination, the combination having the largest total of evaluation values is selected. At subsequent S280, the effective instruction group and the instruction history group are fixed.

At S290, a related-image arrangement process is performed. In the related-image arrangement process, a display image having the ruling-set number "2" is arranged on an area having the ruling-set number "2". The related-image arrangement process will be later described.

At S300, the display images whose assignment has been determined are actually displayed. This process is implemented as a function of the display layout control portion 66 in FIG. 1.

Next the related-image arrangement process S290 will be explained based on the flowchart of FIG. 8. The explanation is given on assumption that the arrangement instruction acquired at S100 in FIG. 6 includes an arrangement instruction to arrange on a virtual area.

Figure 11:
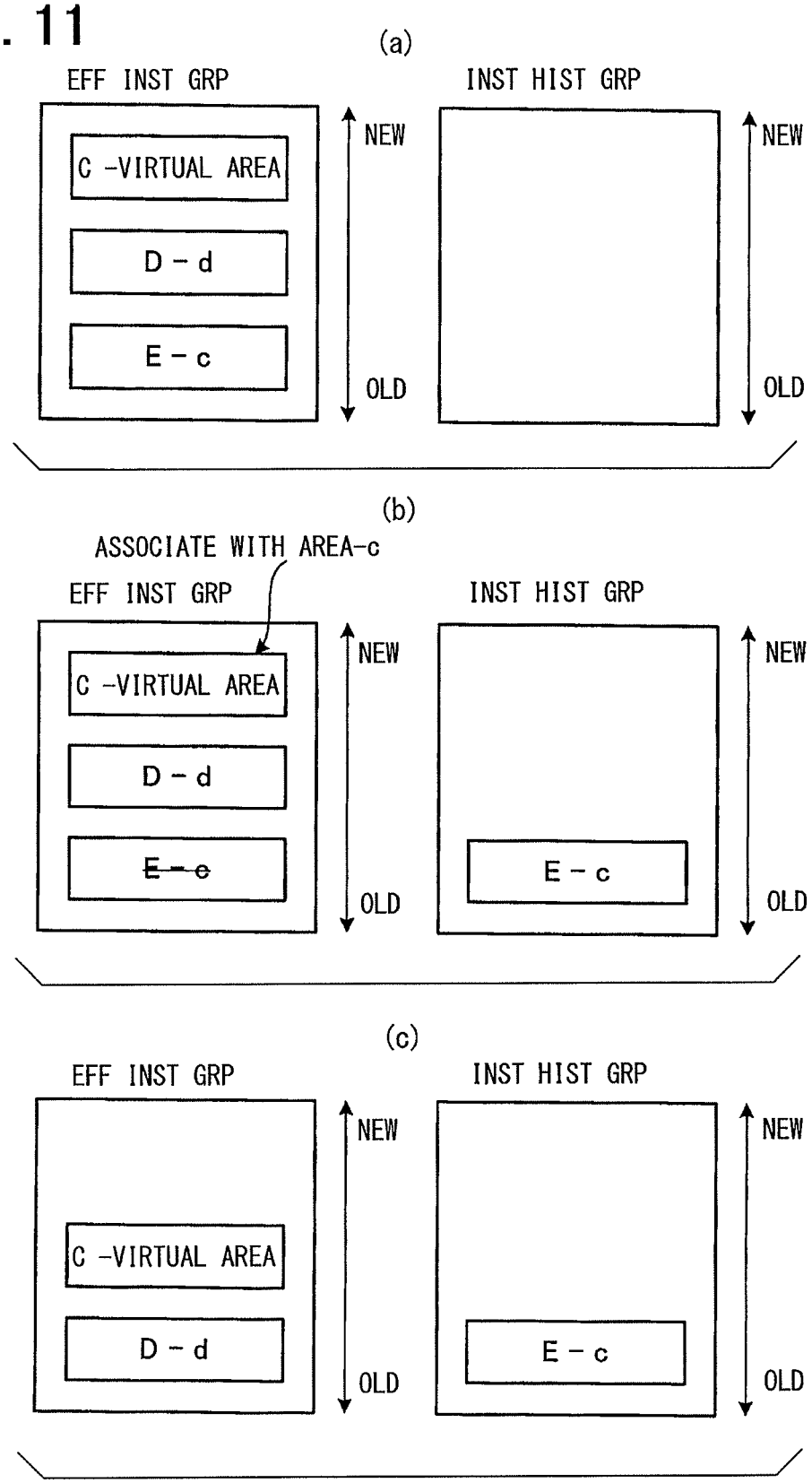
FIG. 11 is an explanatory diagram illustrating associating among a virtual area, an actual area and an arrangement instruction or arranging in the virtual area.

At S291, a closely-related display image is specified. This process specifies a display image that is closely related to the display image that is instructed to be arranged on the virtual area by the arrangement instruction. For example, as illustrated in FIG. 11(a), when the arrangement instruction for the display image C is an instruction to arrange the display image C on a virtual area, a display image closely related to the display image C is specified. To do so, the link information associated with the display image is used.

At S292, the area on which the display image specified at S291 is arranged is specified.

At S293, associating with the virtual area is performed. This process specifies an area closely related to the area specified at S292, and associates the specified area with the virtual area. For example, when a display image closely related to the area a illustrated in FIG. 5(a) is arranged, the virtual area and the area c are associated with each other as illustrated in FIG. 11(b). This uses the link information between the areas stored in the virtual area information management portion 64a.

When the area is not specified at S292, in other words, when the display image specified at S291 is not arranged on any areas, the virtual area is associated with a predetermined area.

At S294, a display image arrangement process is performed. The display image arrangement process is similar to S130 to S160 in FIG. 6. For example, as illustrated in FIGS. 11(b) and 11(c), the arrangement instruction "E-c", which becomes a duplicated arrangement instruction due to associating the virtual area and the area c with each other, is deleted and added to the instruction history group. After S294, the related-image arrangement process is ended.

Concrete examples will be described to provide a better understanding of the display control process.

Figure 12:
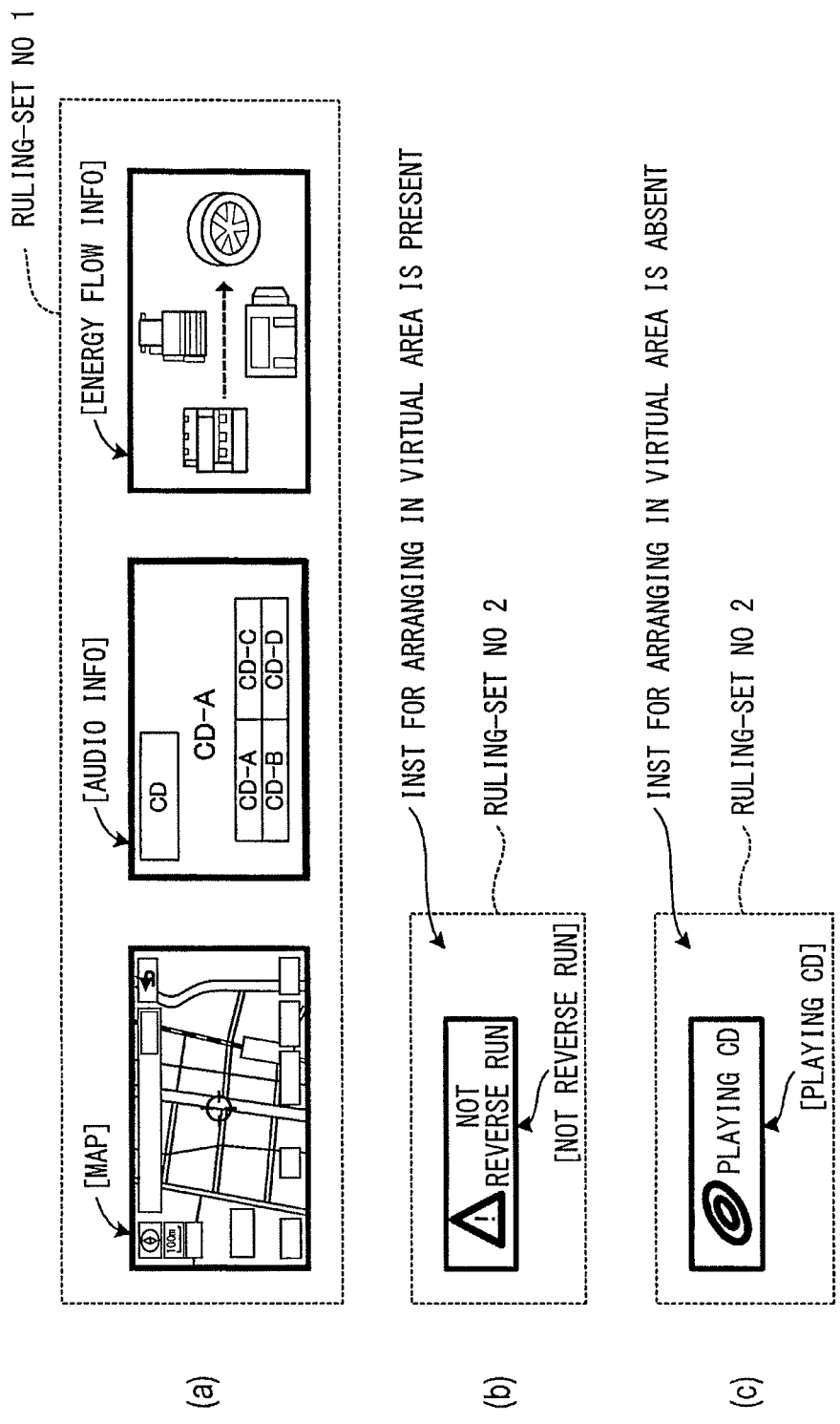
FIG. 12(a) is an explanatory diagram illustrating a display image having a ruling-set number "1"
FIGS. 12(b) and 12(c) are explanatory diagrams illustrating display images having a ruling-set number "2"

As illustrated in FIG. 12(a), the display images having the ruling-set number "1" include "map", "audio information" and "energy flow information". As illustrated in FIG. 12(b), "take care not to reverse run" in the travel assistance information is illustrated as the display image having the ruling-set number "2."

The display image "take care not to reverse run" has the link information to show a close relationship with the display image "map". The virtual area information management portion 64a has the link information between the area a and the area c and the link information between the area b and the area e as the link information linking between the areas. The arrangement instruction to arrange to the virtual area is absent for the display image "take care not to reverse run".

As described above, in the display control process, the display images having the ruling-set number "1" such as "map", "audio information" and "energy flow information" are arranged on the areas first.

Figure 13:
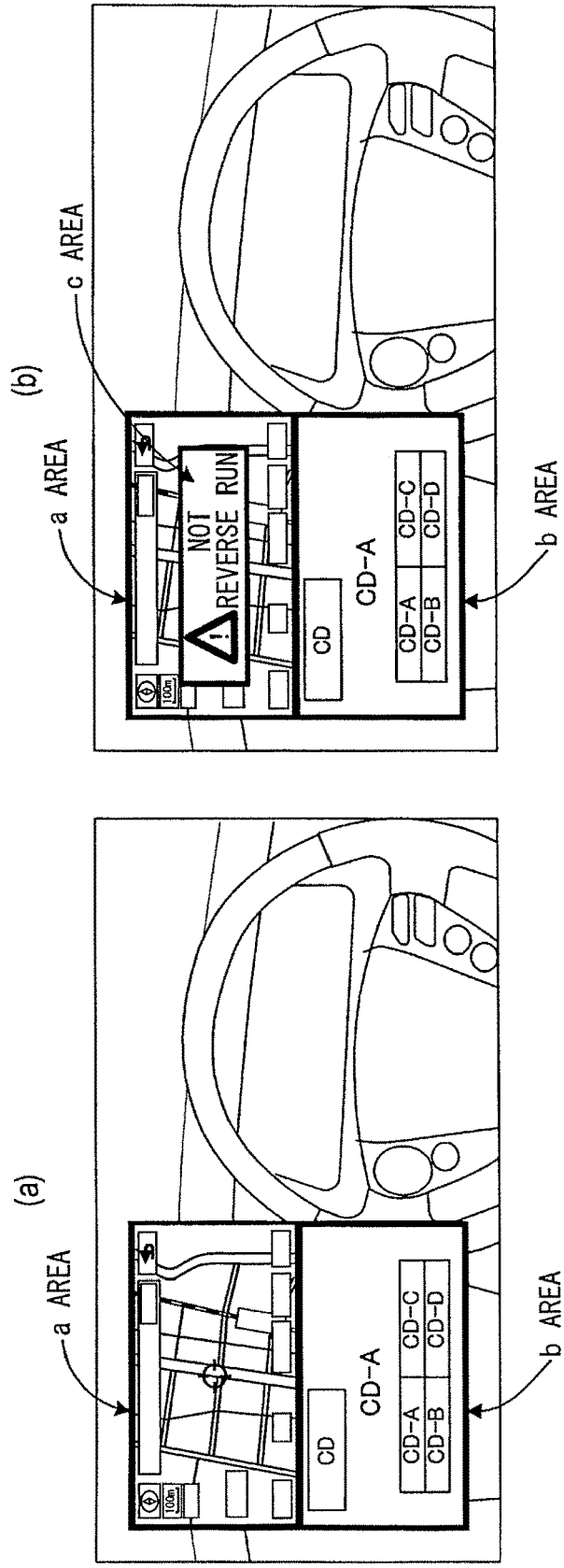
FIGS. 13(a) and 13(b) are explanatory diagrams illustrating a first example of arranging a display image on an area.

Now, let us consider a situation where "map" is arranged on the area a and that "audio information" is arranged on the area b, as illustrated in FIG. 13(a). In this case, the display image "map" closely related to the display image "take care not to reverse run" is specified (S291 in FIG. 8). The area on which the display image "map" is arranged is specified (S292). In this case, because the display image "map" is arranged on the area a, associating the virtual area with the area c is performed (S293). Thus, as illustrated in FIG. 13(b), the display image "take care not to reverse run" is displayed on the area c so that the display image "take care not to reverse run" is superimposed on the display image "map" in the area a.

Figure 14:
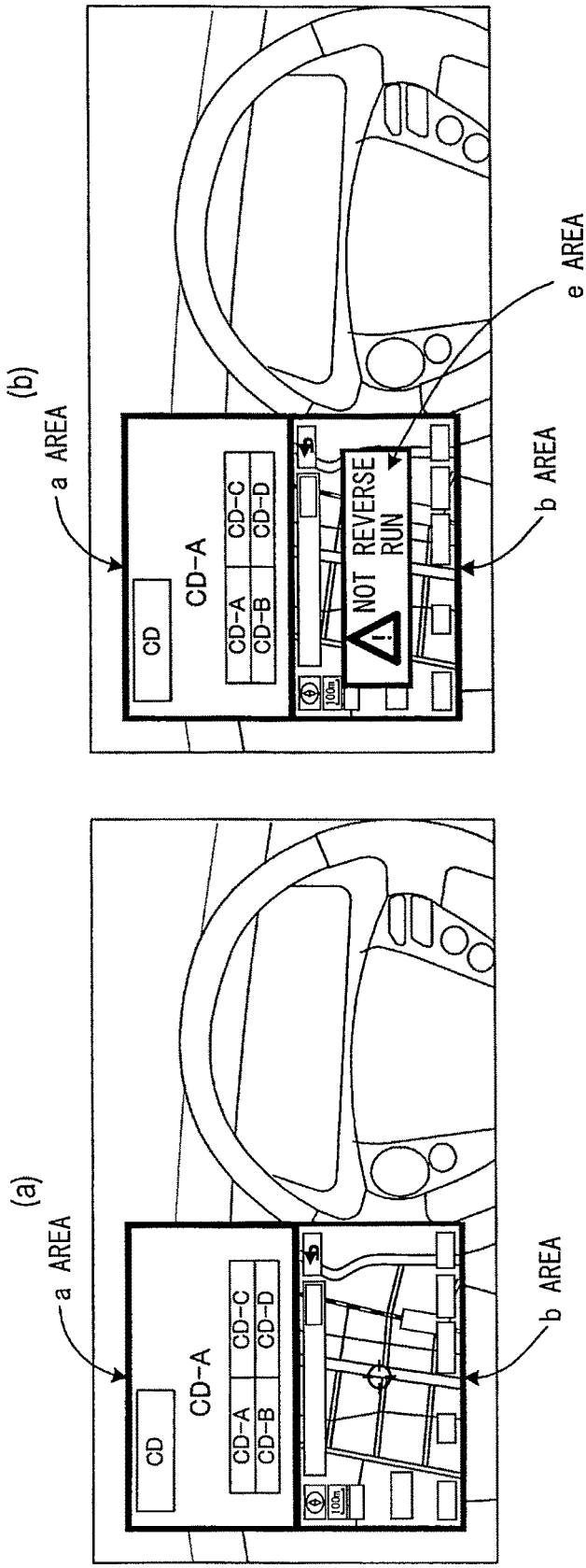
FIGS. 14(a) and 14(b) are explanatory diagrams illustrating a second example of arranging a display image on an area.

Let us consider a situation where "audio information" is arranged on the area a and "map" is arranged on the area b, as illustrated in FIG. 14(a). In this case also, the display image "map" closely related to the display image "take care not to reverse run" is specified (S291 in FIG. 8). The area on which the display image "map" is arranged is specified (S292). In this case, because the display image "map" is arranged on the area b, associating the virtual area with the area e is performed (S293). Thus, as illustrated in FIG. 14(b), the display image "take care not to reverse run" is displayed on the area e so that the display image "take care not to reverse run" is superimposed on the display image "map" in the area b.

Figure 15:
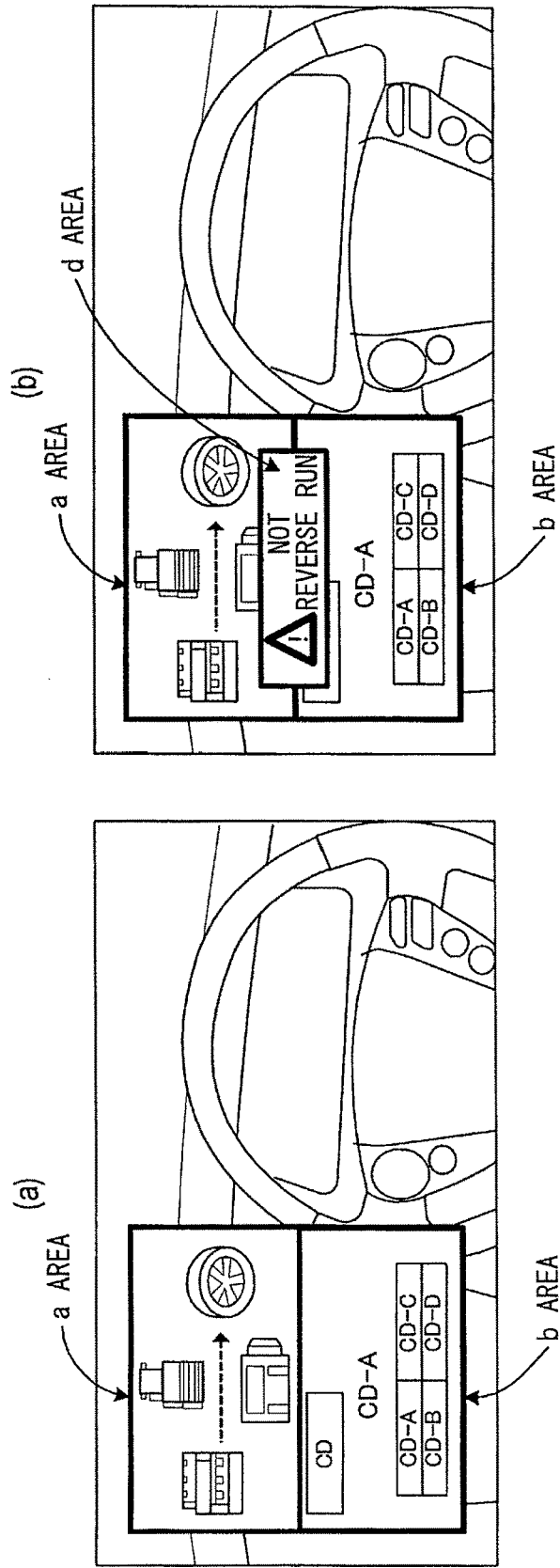
FIGS. 15(a) and 15(b) are explanatory diagrams illustrating a third example of arranging a display image on an area.

Let us consider a situation where "energy flow information" is arranged on the area a and "audio information" is arranged on the area b, as illustrated in FIG. 15(a). In this case also, the display image "map" closely related to the display image "take care not to reverse run" is specified (S291 in FIG. 8). Then, an attempt to identify the area on which the display image "map" is made (S292). However, "map" is displayed on neither the area a nor the area b. Accordingly, associating the virtual area with the area d, which is the predetermined area, is performed. As a result, as illustrated in FIG. 15(b), the display image "take care not to reverse run" is displayed on the area d, which is disposed over the border between the area a and the area b.

Technical effects of the display control apparatus 2 according to the present embodiment will be described.

There is a demand that two display images are displayed, for example, in a side by side manner or an overlapped manner when the two display images are related to each other. For example, assume a demand to pop up a display image Y on a display image X. In this case, when an arrangement instruction may be issued to the display image Y in a system, the system can determine the area for the display image Y only after the conventional system determines the area for the display image X.

In this regard, in the present embodiment, the virtual area information management portion 64a stores the link information linking the areas closely related to each other, and the display image management portion 61 stores the link information linking the display images closely related to each other. Further, the display image management portion 61 and the area information management portion 62 manage the display images and the areas by associating them with the ruling-set numbers.

Figure 6:
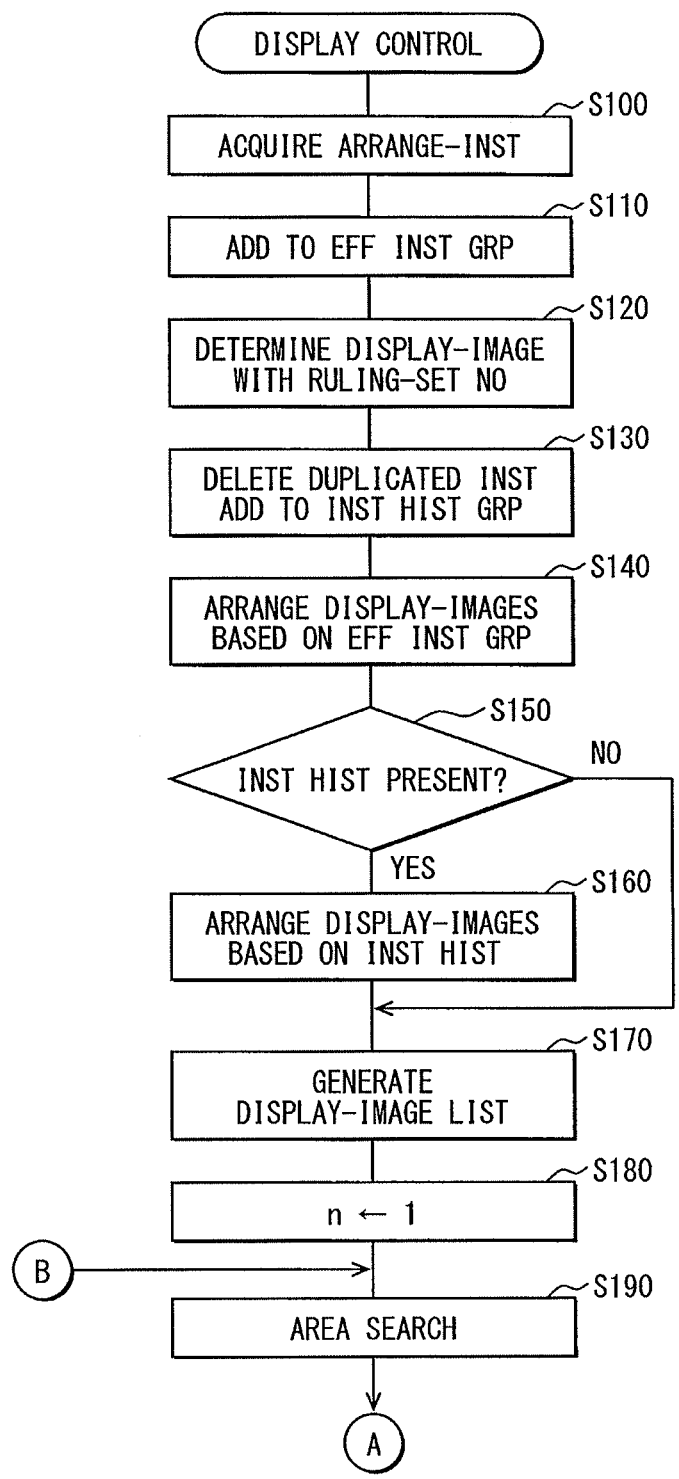
FIG. 6 is a flowchart illustrating the first half of a display control process.

By using the ruling-set number, an image determination portion 65a determines that of two display images related to each other, one belongs to the first image group and the other belongs to the second image group (S120 in FIG. 6). Then, a display image assignment portion 65b automatically performs a predetermined comparison operation to assign the display image, which is determined as belonging to the first image group, to multiple areas (S140, S160, S270). Thereafter, the display image assignment portion 65b assigns the display image, which is determined as belonging to the second image group, to the multiple area based on the area to which the display image belonging to the first image group is assigned and based on the information stored in the virtual area information management portion 64a (S291 to S294 in FIG. 8).

Because of this, when multiple images are related to each other, the multiple display images can be displayed in a manner that facilitates user understanding of the relationship between the multiple display images.

Furthermore, in the present embodiment, the display image assignment portion 65b performs the predetermined comparison operation, before assigning the display images in consideration of the relationship. To perform the predetermined comparison operation, the display image assignment portion 65b acquires the arrangement instruction managed in the arrangement instruction management portion 64 (S100 in FIG. 6), adds the arrangement instruction to the effective instruction group (S110), and then, deletes the duplicated arrangement instruction, and adds the duplicated arrangement instruction to the instruction history group (S130). The display image assignment portion 65b assigns the display image based on the effective instruction group (S140). If there is the non-duplicated arrangement instruction in the instruction history group (S150: YES), the display image is further assigned based on the instruction history group (S160). That is, the present embodiment is provided with the arrangement instruction management portion 64 for storing the arrangement instruction, which is an instruction to arrange a display image to an area and which is generated by a user operation or a system request. As the predetermined comparison portion, the display image assignment portion 65b performs display mediation based on the arrangement instructions. Therefore, when the display images based on the arrangement instructions each generated by a system request or a user operation are related to each other, the display images can be displayed in a manner that facilitates a user understanding of the relationship between the display images.

Furthermore, in the present embodiment, the area information management portion 62 equally manages areas of the three display apparatuses 21-23 without distinction. That is, the area information management portion 62 manages multiple display apparatuses on an area-to-area basis. This facilitates addition and deletion of a display apparatus.

Furthermore, in the present embodiment, the display images based on a variety of information can be acquired via a network. The display images are various, including "audio information", "vehicle speed", "engine revolution", "map", "travel assistance information", and "outside air temperature". The display image management portion 61 manages the display images that are based on the information acquired via an in-vehicle network. Because of this, various display images can be displayed in a manner that facilities a user understanding of a relationship of these display images.

Embodiments are not limited to the above-illustrated embodiment. For example, embodiments may have the following configuration.

In the above-illustrated embodiment, the virtual area information management portion 64a of the arrangement instruction management portion 64 of FIG. 1 stores the link information linking between the closely related areas. Alternatively, as illustrated in FIG. 2(b), the area information management portion 62 may manages areas in association with the link information, which indicates the linking with closely-related areas. In this case, the area information management portion 62 may store four attributes (parameters) by associating them with each other, where the four attributes are "area suitability", "area size", "ruling-set number" and "link information" are stored in the area information management portion 62. Alternatively, the link information may be stored in both the virtual area information management portion 64a and the area information management portion 62. In this case, when the link information in the virtual area information management portion 64a is different from that in the area information management portion 62, the link information in one of them may be preferentially used.

The above embodiment 1 assumes the arrangement instruction to arrange on a virtual area. However, it is conceivable that even when the arrangement instruction to arrange on a virtual area is absent for a display image having the ruling-set number 2, the display image having the ruling-set number 2 may be displayed by being associated with a display image having a ruling-set number 1. Thus, for example, the link information between areas may be stored in the virtual area information management portion 64a for the display image having the arrangement instruction to arrange on a virtual area. For the display image having no arrangement instruction to arrange on a virtual area, the link information between areas may be stored in the area information management portion 62.

Figure 8:
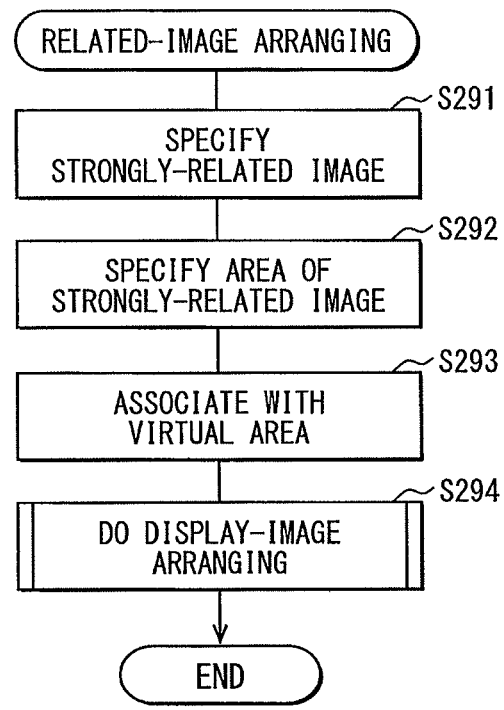
FIG. 8 is a flowchart illustrating a related-image arrangement process in the display control process.

In this case, S293 in FIG. 8 performs associating with the virtual area, and specifies the closely-related area if the arrangement instruction to arrange on a virtual area is absent. In the above, it is determined whether or not the arrangement instruction to arrange on a virtual area is present. When the arrangement instruction to arrange on a virtual area is present, the link information between the areas stored in the virtual area information management portion 64a is used. When the arrangement instruction to arrange on a virtual area is absent, the link information between the areas stored in the area information management portion 62 is used.

A concrete example of the display image for which the arrangement instruction to arrange on a virtual area is absent is a display image "Playing CD" as illustrated in FIG. 12(c).

Figure 16:
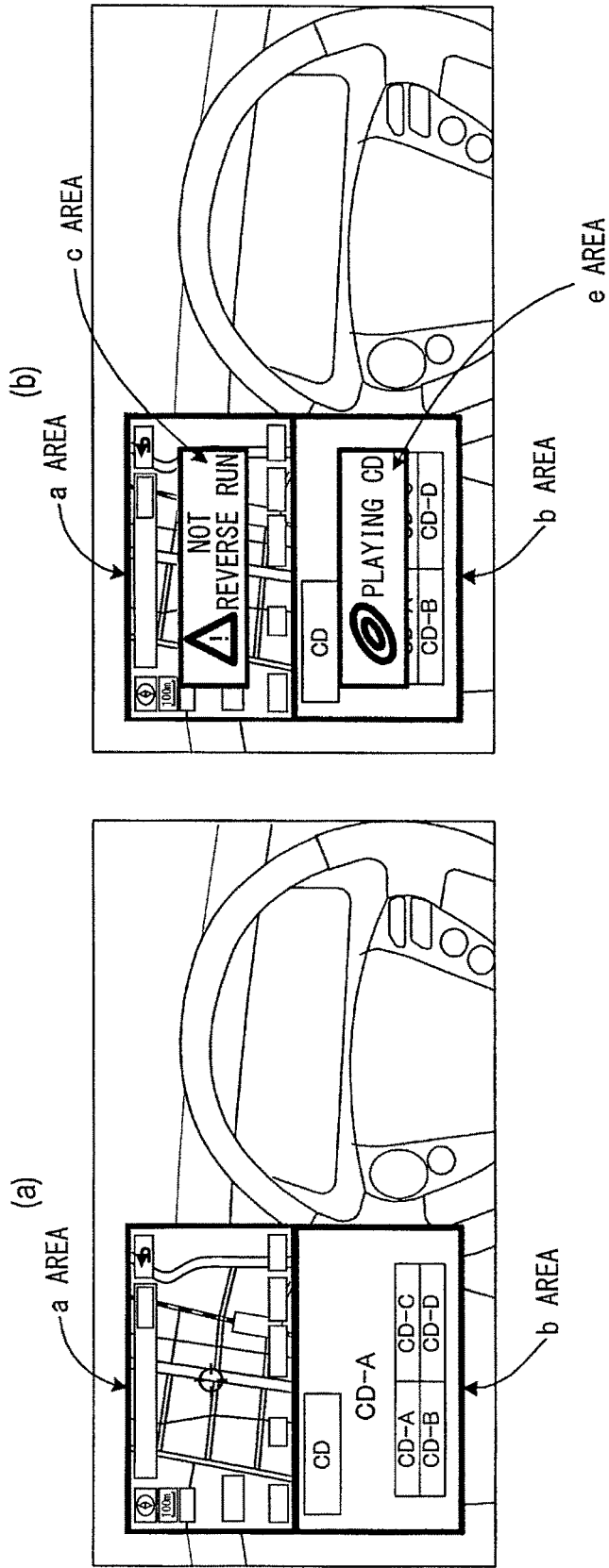
FIGS. 16(a) and 16(b) are explanatory diagrams illustrating a fourth example of arranging a display image on an area.

Now, assume that "map" is arranged on the area a and "audio information" is arranged on the area b, as illustrated in FIG. 16(a).

In this case, the display image "map", which is closely related to the display image "take care of no reverse run", is specified (S291 in FIG. 8). The area on which the display image "map" is arranged is specified (S292). Because the display image "map" is arranged on the area a, associating the virtual area with the area c is performed (S293). Additionally, the display image "audio information", which is closely related to the display image "Playing CD", is specified (S291 in FIG. 8). The area on which the display image "audio information" is arranged is specified (S292). Because the display image "audio information" is arranged on the area b, the area e is specified (S293). Therefore, as illustrated in FIG. 16(b), the display image "take care of no reverse run" is displayed on the area c and superimposed on the display image "map" on the area a. Additionally, the display image "Playing CD" is displayed on the area a and superimposed on the display image "audio information" on the area b.

In the above embodiment, the list is generated (S170 in FIG. 6) for the display images for which the arrangement instruction to arrange on a virtual area is present. The evaluation value is calculated from the information value of each display image and the area suitability of each area, and the area having the largest evaluation value is selected and stored (S230, S240). Specifically, the area information management portion 62 stores area suitabilities in association with areas, wherein the area suitability for each area is suitability of assignment of a display image to the each area. The display image management portion 61 stores information values in association with display images, wherein the information value for each display image indicates the value of display of the each display image. As the predetermined comparison operation, the display image assignment portion 65b performs display mediation based on the information value and the area suitability.

Accordingly, even when the arrangement instruction is absent for a display image, the display images can be displayed in a manner that facilitates a user understanding of their relationship.

Furthermore, in the above embodiment, the area information management portion 62 equally manages areas of the three display apparatuses 21-23 without distinction. Thus, when part of the display apparatuses is detached for example, the area information management portion 62 may update the information on areas. Additionally, when part of the display apparatuses is detached for example, the virtual area information management portion 64a (the area information management portion 62) may update the area-related information including the link information between areas. This further facilitates addition and deletion of a display apparatus.

Furthermore, in the above embodiment, the display images based on a variety of information can be acquired via a network. Thus, when part of the external apparatuses is detached for example, the display image management portion 61 may update information on display images. Additionally, when part of the external apparatuses is detached for example, the display image management portion 61 may update the image relationship information including the link information between the display images. This enables to display various display images in a manner that facilitates a user understanding of their relationship, even when the external apparatus is detached.

(Second Embodiment)

Figure 17:
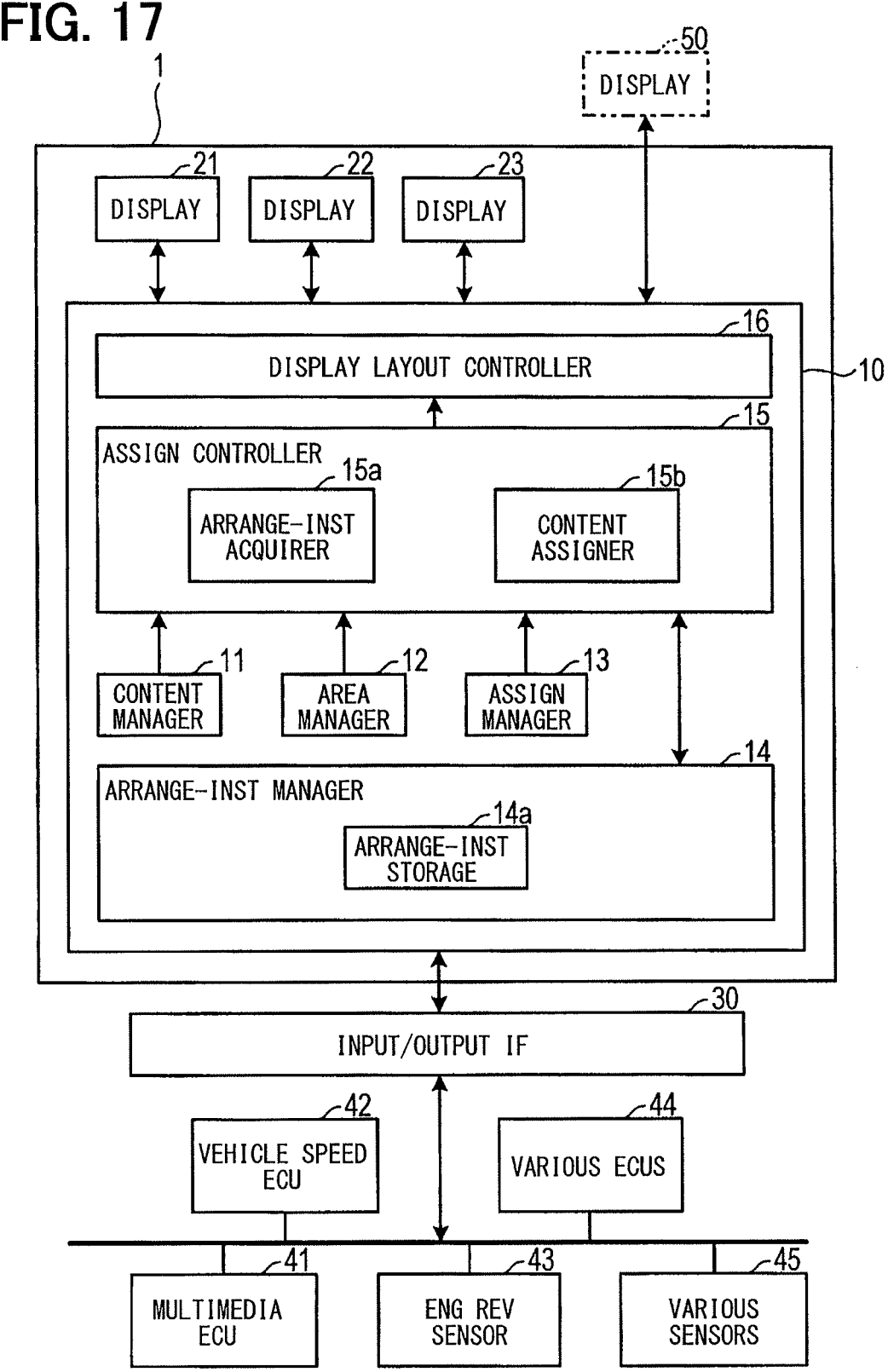
FIG. 17 is a block diagram schematically illustrating a configuration of a display control apparatus according to a second embodiment.

FIG. 17 is a block diagram schematically illustrating a configuration of a display control apparatus 1 according to an embodiment.

The display control apparatus 1 includes a controller 10 as a major component. The controller 10 connects with three displays 21, 22, and 23, and an input/output IF 30. For the purpose of distinction, the three displays 21 to 23 may be termed "first display apparatus 21," "second display apparatus 22," and "third display apparatus 23" as needed in the description below.

The three display apparatuses 21 to 23 are respectively embodied as a head-up display, a meter panel, and a liquid crystal display apparatus to display maps for navigation, for example. However, the display apparatuses are not limited to this.

The input/output IF 30 enables connection to an in-vehicle network (e.g., CAN). Via the input/output IF 30, the display control apparatus 1 is connected to a multimedia ECU 41, a vehicle speed ECU 42, an engine speed sensor 43, various ECUs 44, and various sensors 45. The various ECUs 44 include a navigation ECU, for example. The various sensors 45 include an outside air temperature sensor to detect the temperature outside the vehicle compartment and a water temperature sensor to detect the coolant temperature.

This configuration enables the display control apparatus 1 to acquire various contents via the network. Various contents include "audio information" acquired from the multimedia ECU 41, "vehicle speed" acquired from the vehicle speed ECU 42, "engine speed" acquired from the engine speed sensor 43, "map" acquired from the navigation ECU included in the various ECUs 44, and "outside air temperature" acquired from the outside air temperature sensor included in the various sensors 45.

The controller 10 includes a content management portion 11, an area management portion 12, an assignment management portion 13, an arrangement control portion 14, a assignment control portion 15, and a display layout control portion 16.

Figure 18:
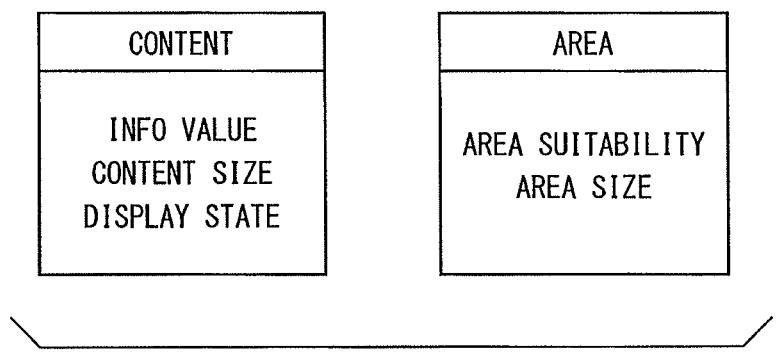
FIG. 18 is an explanatory diagram illustrating attributes associated with contents and areas.

The content management portion 11 manages various contents including those belonging to different categories. The content management portion 11 includes a storage (storage portion) to store three attributes (parameters) such as "information value," "content size," and "display state" associated with each content as illustrated in FIG. 18.

The information value of the present embodiment denotes the value of a content for each target viewer. Specifically, the information value indicates how a content is useful for a specific target viewer in comparison with another target viewer. In the present embodiment, target viewers include a driver, a front-seat passenger, and a rear-seat passenger. That is, the value of content depends on target viewers. For example, the contents such as "vehicle speed" and "engine speed" are of high value (utility) for the driver. Therefore, each content has three types of value, information value (driver), information value (front-seat passenger), and information value (rear-seat passenger). The embodiment assumes that the information value is stored as a numeric value of "0" or larger.

The content size concerns size of an area needed to display a content. The content size is represented as the number of vertical and horizontal pixels, for example.

The display state is flag information indicating whether the content is to be displayed or not. The display state is set to be "active state" indicating that the content is to be displayed or "inactive state" indicating that the content is not to be displayed.

Specifically, each content switches between "activate state" and "inactivate state" depending on vehicle situations or user operations. For example, when the gear shift range is R, the content for "back monitor" based on information captured by a rear view camera is in "active state". When the gear shift range is other than "R", the content for "back monitor" is in "inactive state". For example, when a user turns on an audio switch, the content for "audio information" is put in the "activate state". When a user turns off the audio switch, the content for "audio information" is put in "inactive state".

Explanation returns to FIG. 17. The area management portion 12 has a function for managing multiple areas as display regions. The areas according to the embodiment are provided in screens of the three display apparatuses 21 to 23. The area information management portion 12 similarly manages the areas of the three display apparatuses 21 through 23. The area management portion 12 equally manages areas of the first display apparatus 21 and those of the second display apparatus 22. As illustrated in FIG. 18, the area management portion 12 includes a storage, which stores two attributes (parameters) while associating them with each area. The two attributes are "area suitability" and "area size".

The area suitability is used as an index indicating viewability for each target viewer. As described above, target viewers include a driver, a front-seat passenger, and a rear-seat passenger. That is, the area suitability varies from target viewer to target viewer. For example, areas in a meter panel have the large area suitability for the driver. Areas in a liquid crystal display apparatus for displaying maps for navigation have the large area suitability for the driver and the front-seat passenger. Each area has three suitabilities, which are area suitability (driver), area suitability (front-seat passenger), and area suitability (rear-seat passenger). In the present embodiment, the area suitability has ten grades "1" through "10" but is not limited thereto.

The area size concerns size of an area. Similarly to the content size, the area size is represented as the number of vertical and horizontal pixels, for example.

The area management portion 12 manages areas as hierarchical data structure, wherein the areas are configured in the display apparatuses 21 through 23. In other words, the area management portion 12 may use a display screen of each display apparatus as a single area or as divided display areas. For this purpose, the area management portion 12 includes a storage that stores variables indicating hierarchical structure relationship among areas. FIG. 19 illustrates areas for the first display apparatus 21, which can provide the display areas a through g. The above-mentioned storage stores inclusive relationship among the areas. The inclusive relationship is referenced when a combination of contents and areas is extracted. An area included in the already allocated area is excluded from candidate areas of content assignment.

FIG. 19 (a) illustrates display areas for the first display apparatus 21. Area a uses the entire screen. Area a is vertically divided into two areas b and c. Area b is further vertically divided into two areas d and a. An area c is horizontally divided into two areas f and g.

As illustrated in FIG. 19(a), the area a is managed as an area belonging to the highest hierarchy. The areas b and c are managed in a hierarchy immediately below area a. The areas d and a are managed in a hierarchy immediately below area b. The areas f and g are managed in a hierarchy immediately below area c.

For example, when a content is assigned to the area b as illustrated in FIG. 19(c), it is determined that the areas d and a belonging to the lower hierarchy are unavailable. When a content is assigned to only the area b, which is an area immediately below the area a as one of areas b and c (when areas c, f, and g are not used), it is sufficient to display the content on an inside of the area a. For example, the content may be centered over areas b and c.

Explanation returns to FIG. 17. The assignment management portion 13 stores an indispensable exclusive constraint equation and assignment information. The assignment information is provided to assign a predetermined content to a predetermined area.

The indispensable exclusive constraint equation is predetermined to assign the necessary content to a proper area or prevent duplicate contents from being redundantly displayed in multiple areas.

The present embodiment defines the indispensable exclusive constraint equation using five operators &, |, ^, /, and +. FIG. 20(a) is a drawing listing meanings of the operators. For example, suppose X and Y are active contents. Then, X&Y signifies that both X and Y are displayed.

X|Y signifies that at least one of X and Y is displayed.
X^Y signifies that X or Y is displayed.
X/Y signifies that X or Y is displayed or neither X nor Y is displayed.
X+Y signifies that both X and Y are displayed or neither X nor Y is displayed.

X/Y and X&Y have the opposite meaning. X+Y and X^Y have the opposite meaning. In the present embodiment, the display control process to be described later uses the operators. The display control process avoids using an operator signifying negation, for simplicity of processes.

An indispensable exclusive constraint equation for areas is similar to that for the contents.

The assignment information about assignment of a specific content to a specific area indicates a correspondence relationship between a predetermined area and a predetermined content.

Explanation returns to FIG. 17. The arrangement instruction management portion 14 stores an arrangement instruction which is provided by a system and an arrangement instruction which is based on user operations. The arrangement instruction management portion 14 manages the arrangement instructions, which are dynamical and thus different than the assignment information stored in the assignment management portion 13. An arrangement instruction may be generated by a system request. An arrangement instruction may be generated by a user request.

For example, when the gear shift range is put in "R, an instruction to arrange the content "back monitor" in the area displaying the navigation map is issued as an arrangement instruction provided by a system. When a user turns on an audio switch, an instruction to arrange the content "audio information" in the area displaying the navigation map is issued as an arrangement instruction that is based on a user operation. The arrangement instructions based on user operations include an instruction to move a displayed image to another area by a drag operation or the like.

Specifically, the arrangement instructions described herein include an instruction to arrange a specific content to a specific area in place of a content originally displayed on the specific area. This is a sort of "late-come-win arrangement".

In the present embodiment, based on the information stored in the content management portion 11, the area management portion 12, the assignment management portion 13 and the arrangement instruction management portion 14, the assignment control portion 15 first assigns a content to an area based on the arrangement instruction of the arrangement instruction management portion 14. Thereafter, as to a content having no arrangement instruction, the assignment control portion 15 calculates an evaluation value of the content with respect to an area and assigns the content to the area. Based on the assignment of the contents to the areas by the assignment control portion 15, the display layout control portion 16 displays the contents.

In order to achieve arranging contents by taking into account a relationship between the contents as described later, the present embodiment manages contents and areas on a ruling-set-to-ruling-set basis. In the case of multiple ruling-sets, the assignment is performed on a ruling-set-to-ruling-set basis, so that the ruling-set including the content to be preferentially assigned to an area is processed first.

Figure 21:
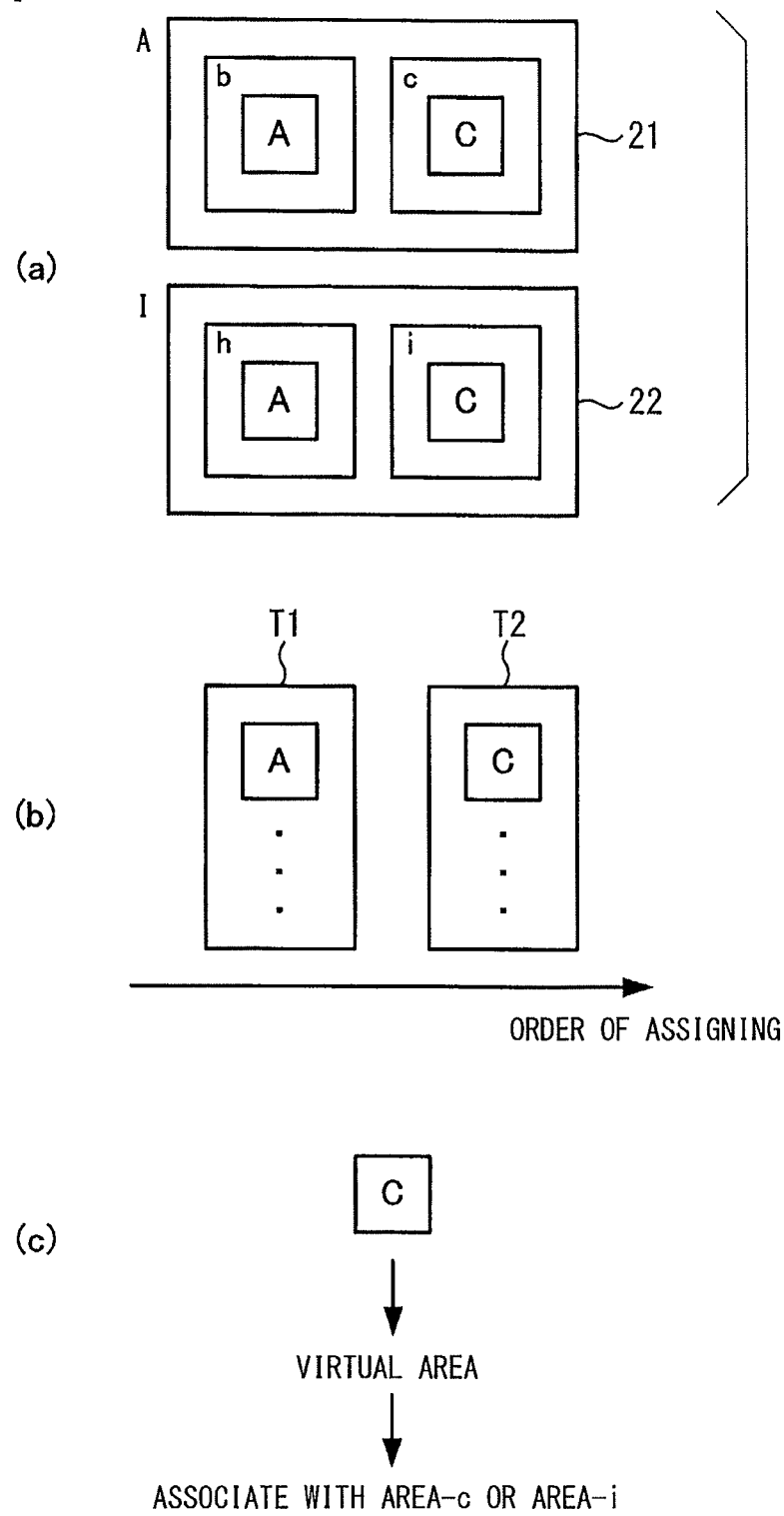
FIGS. 21(a), 21(b) and 21(c) are explanatory diagrams illustrating a ruling-set for an instruction to arrange in a virtual area.

For example, suppose that there are a content A and a content C relating to the content A, and that a request to display the content A and the content C side by side arises. For example, as illustrated in FIG. 21(a), when the content A is arranged on the area b of the first display apparatus 21, the content C is displayed on the area c adjacent to area b. When the content A is arranged on the area h of the second display apparatus 22, the content C is displayed on the area i adjacent to the area h. In the above, only after it is determined whether to arrange the content A on the area b or the area h, the area of the content C is determined. Therefore, as illustrated in FIG. 21(b), the assignment is performed in the following order: the ruling-set T1 including the content A→the ruling-set T2 including the content C.

It is conceivable that the above described arrangement instruction is issued to the content C. Specifically, the pop up of the content C on the content A is issued. In this case, until the area of the content A is determined, the arrangement instruction to arrange the content C on a specific area cannot be executed.

In view of this, the present embodiment employs a concept of virtual area. Specifically, as illustrated in FIG. 21(c), the arrangement instruction to arrange the specific content C on a virtual area is issued. Then, after the content A is assigned, a process of associating the virtual area with the area c or i is performed.

Figure 22:
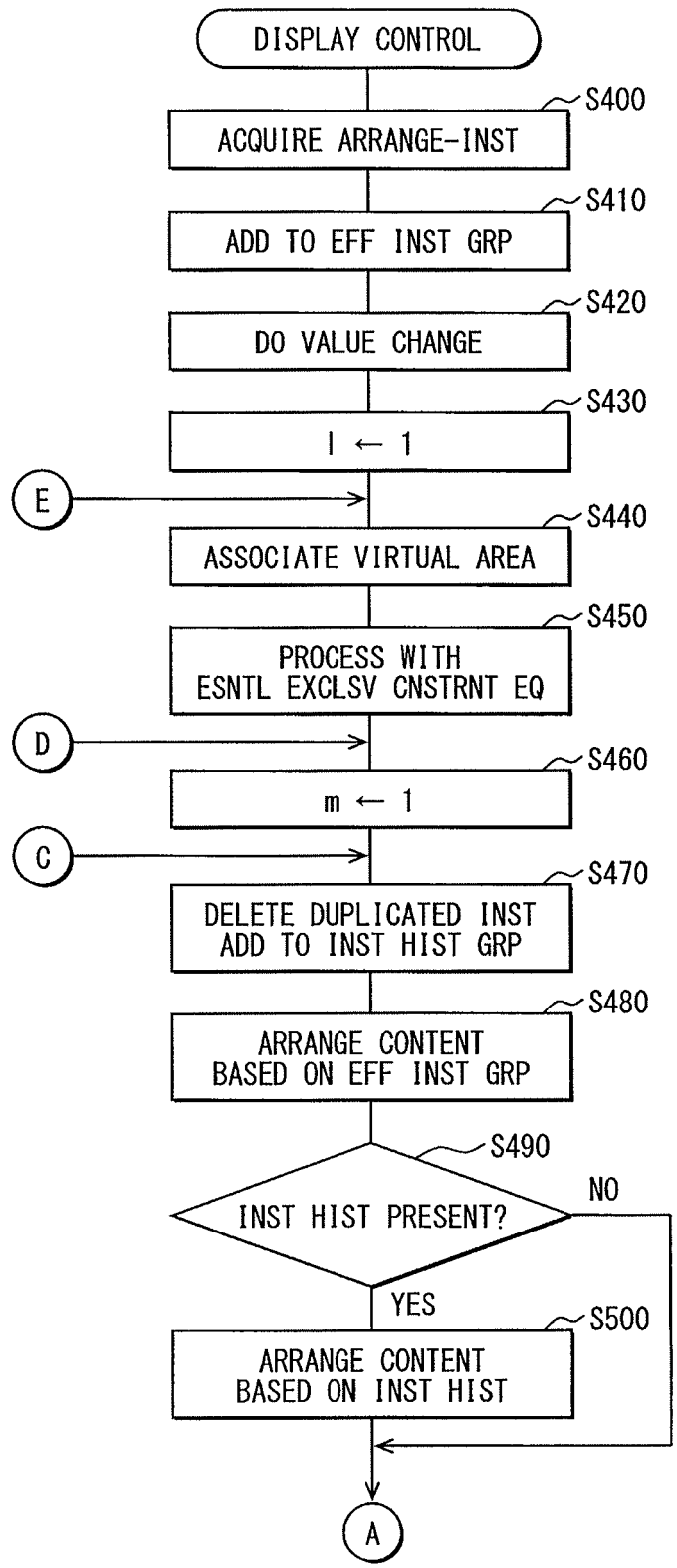
FIG. 22 is a flowchart illustrating the first half of a display control process.
Figure 23:
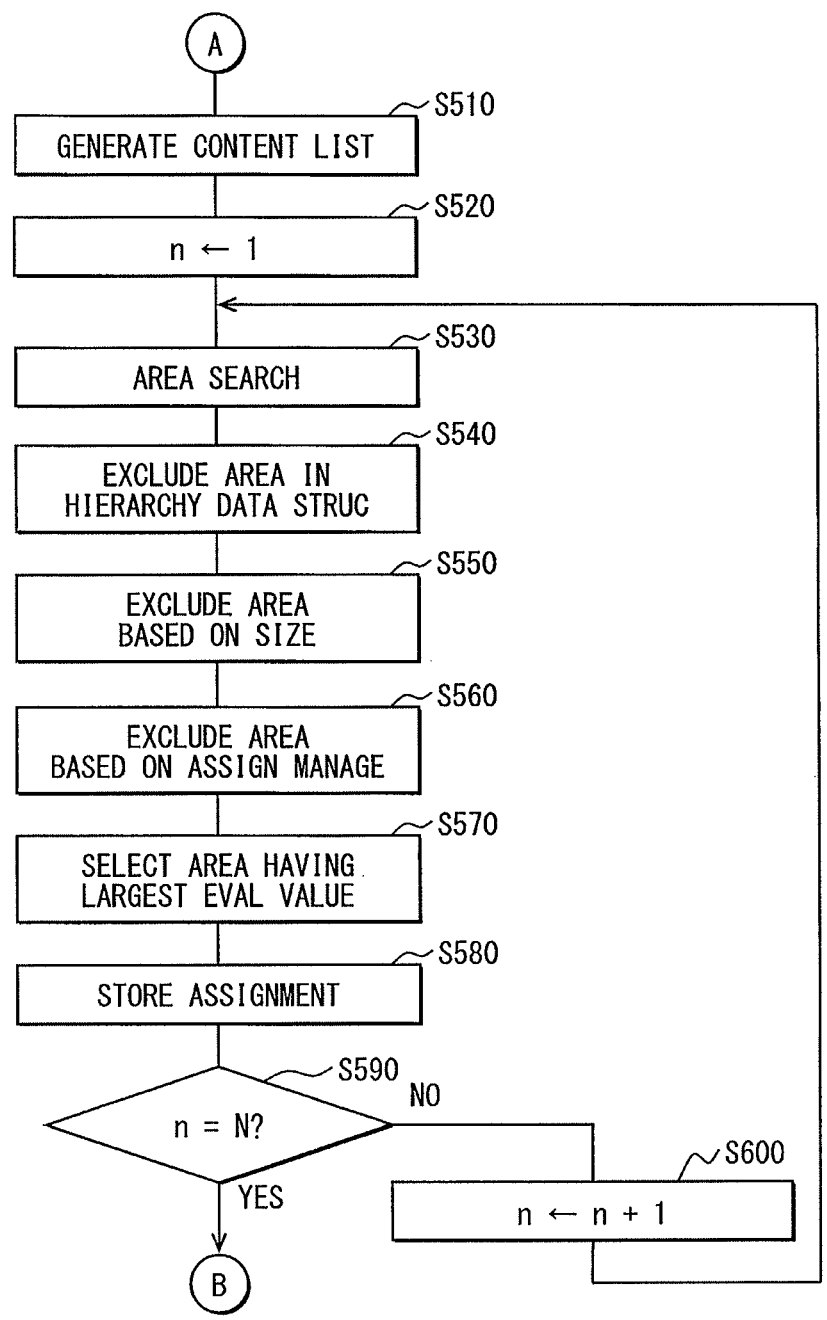
FIG. 23 is a flowchart illustrating the middle half of the display control process.
Figure 24:
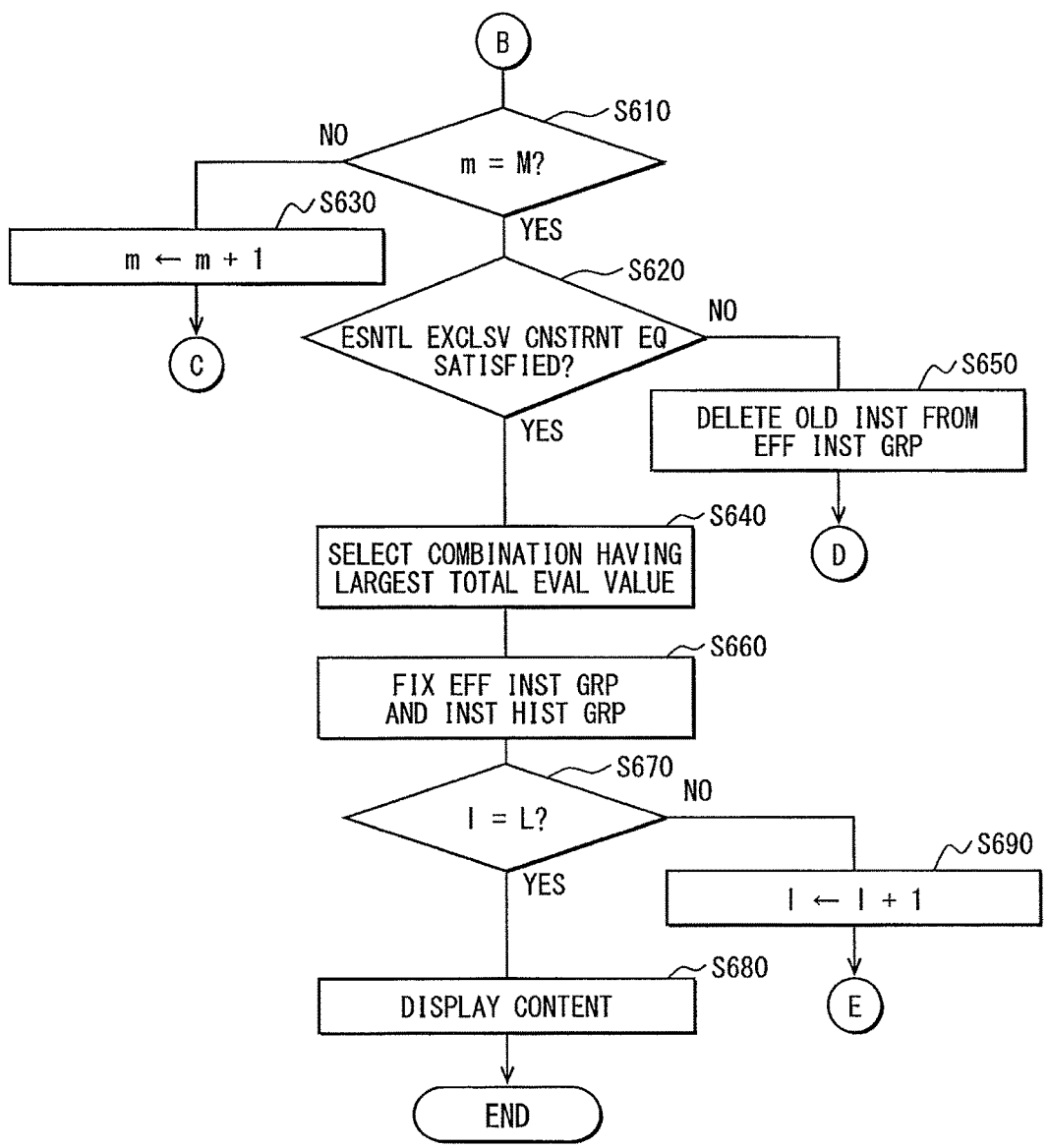
FIG. 24 is a flowchart illustrating the latter half of the display control process.

The display control process is described below. The display control process is performed by, for example, the controller 60. FIG. 22 is a flowchart illustrating the first of the display control process. FIG. 23 is a flowchart illustrating the middle of the display control process. FIG. 24 is a flowchart illustrating the last of the display control process. In the description below, the information value and the area suitability are collectively referred to as "value". The content size and the area size are collectively referred to as "size" on an as-needed basis.

First, at S400, the arrangement instruction is acquired. As described above, this arrangement instruction is the arrangement instruction which is provided by a system or which is based on the user operation, and which is managed by the arrangement instruction management portion 14.

At S410, the arrangement instruction is added to an effective instruction group. In the present embodiment, the effective instruction group and an instruction history group are configured. The effective instruction group is a group of arrangement instructions which are stored in chronological order. The instruction history group indicates, in chronological order, a history of deleting arrangement instructions from the effective instruction group after storing the arrangement instructions in the effective instruction group. For example, when an arrangement instruction "E-c" is acquired at S400, the arrangement instruction "E-c" is added to the effective instruction group, as illustrated by two-dotted-dashed line in FIG. 25(a).

A value change process is performed at S420. This process changes the information value of a content and the area suitability of an area based on a vehicle situation (in the embodiment, a running situation indicating whether the vehicle is running or stopped).

Although the present embodiment performs the value change process, it may not be indispensable. Another embodiment may omit the value change process. Alternatively, the value change process may be performed only when a predetermined condition is satisfied.

At S430, a variable I indicating the ruling-set is initialized to "1." As the variable I is incremented, the process is performed in an order of a 1st ruling-set, a 2nd ruling-set, a 3rd ruling-set and so on.

At S440, associating with a virtual area is performed. This process is performed when the arrangement instruction to arrange to a virtual area is present in the effective instruction group and the assignment of a related content to an area is already determined.

Figure 26:
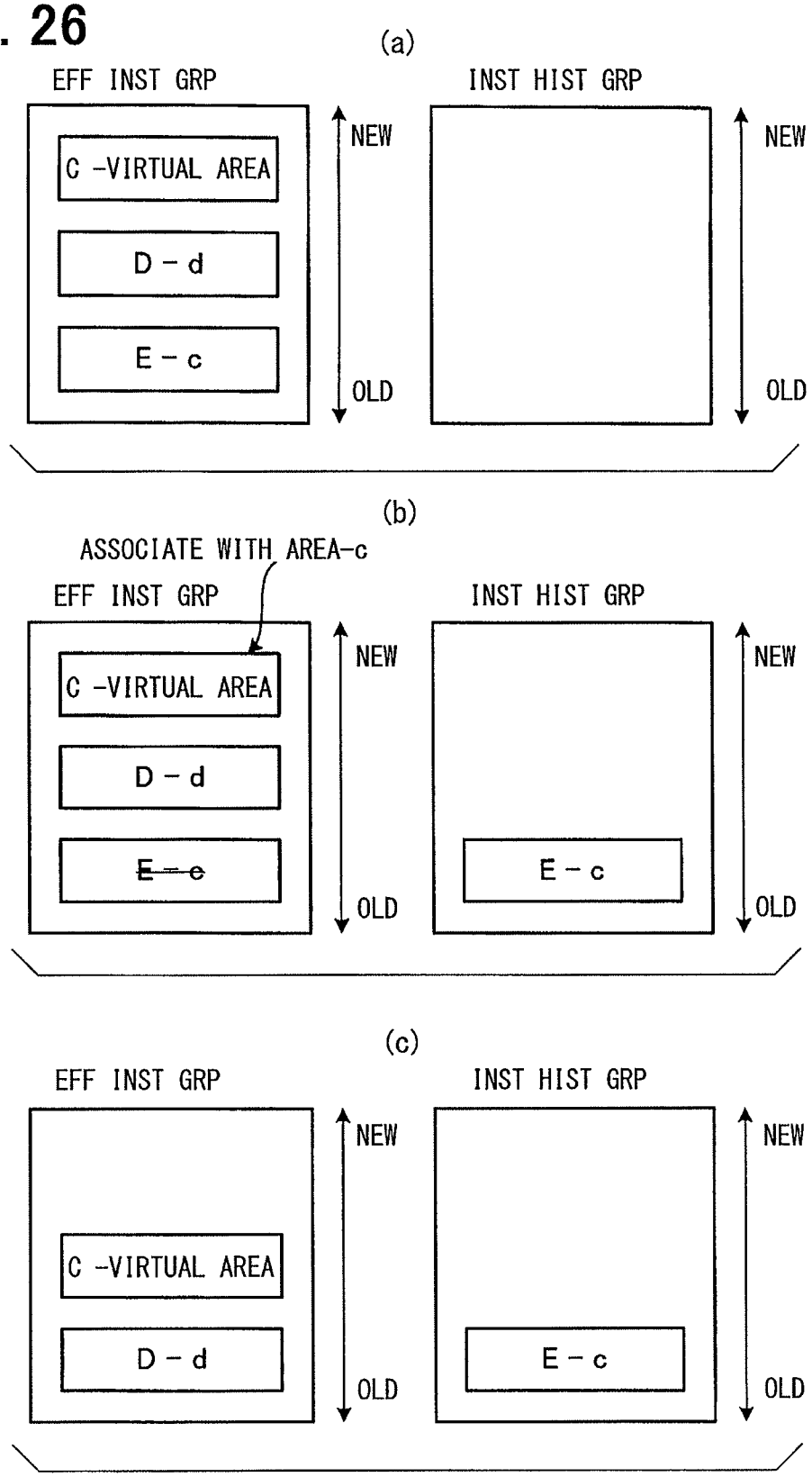
FIGS. 26(a), 26(b) and 26(c) are explanatory diagrams illustrating associating among a virtual area, an actual area and an arrangement instruction or arranging in the virtual area.

For example, suppose that an arrangement instruction "C-virtual area" is present in the effective instruction group, as illustrated in FIG. 26(a). In this case, if the content A, which is related to the content C, is assigned to the area b illustrated in FIG. 21(a), associating the area c with the virtual area is performed.

At S450, a process with an indispensable exclusive constraint equation is performed. If an attempt is made to apply the indispensable exclusive constraint equation to contents, the indispensable exclusive constraint equation may have a content whose display state is "inactive state". For this reason, the present embodiment previously performs a process by which an indispensable exclusive constraint equation having "inactive state" content is changed into an equivalent and simpler indispensable exclusive constraint equation.

Specifically, a syntax tree is generated from the indispensable exclusive constraint equation as illustrated in FIG. 20(b). FIG. 20(b) shows the indispensable exclusive constraint equation "(A&Z)^B" as a syntax tree. Suppose that contents A and B are in "active state" and content Z is in "inactive state." In this case, the content Z is removed from the syntax tree and its prior operator "&" is removed from the syntax tree (see symbol J). As a result, the syntax tree becomes that illustrated in FIG. 20(c) and the indispensable exclusive constraint equation becomes "X^B." In this way, the technique of removing an "inactive state" content and its prior operator is applied to cases of prior operators &, |, and ^.

When a prior operator is "/" as illustrated in FIG. 20(d), the "inactive state" content Y and its prior operator "/" are removed (see symbol L) and the content X posterior to the removed operator "/" is removed (see symbol K). The same applies to operator "+."

If an operator indicative of negation is used in an indispensable exclusive constraint equation, an expected result cannot be obtained. For this reason, the present embodiment does not use an operator indicative of negation.

At S450, a content-area combination is generated based on the indispensable exclusive constraint equation.

First, a content list based on the indispensable exclusive constraint equation is acquired. For example, in the case of the indispensable exclusive constraint equation "AAB", when the contents "A, B, C, D" are included in the I-th ruling-set, two lists are extracted. One is a list "A, C, D" and the other is a list "B, C, D", as illustrated in FIG. 27(a).

Likewise, a list of areas based on the indispensable exclusive constraint equation is acquired. For example, in the case of the indispensable exclusive constraint equation "a/b", when the areas "a, b, c, d" are included in the I-th ruling-set, two lists are extracted. One is a list "a, c, d" and the other is a list "b, c, d", as illustrated in FIG. 27(b).

Figure 27:
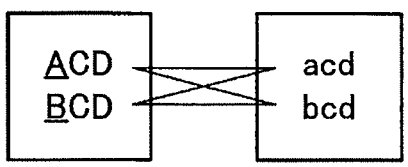
FIG. 27(a) is an explanatory diagram illustrating an indispensable exclusive relationship of contents.
FIG. 27(c) is an explanatory diagram illustrating a combination of contents and areas.

Because of this, four combinations are obtained as illustrated in FIG. 27(c). The four combinations are a combination of contents "A, C, D" and areas "a, c, d", a combination of contents "A, C, D" and areas "b, c, d", a combination of contents "B, C, D" and areas "a, c, d", and a combination of contents "B, C, D" and areas "b, c, d". In the drawing, the underline below the contents A, B shows that the contents A, B are indispensable display items. Now, further explanation will be given on assumption that the total number of combinations obtained is M.

At subsequent S460, a variable m indicating the combination of contents and areas is initialized to 1. As the variable m is incremented, the process is performed in an order of the 1st combination, the 2nd combination, the 3rd combination and so on.

At next S470, the duplicated instruction is deleted and added to the instruction history group. In this process, when the effective instruction group contains the arrangement instructions whose contents or areas are duplicated, the past arrangement instruction is deleted. Additionally, the deleted past arrangement instruction is added to the instruction history group.

In FIG. 25 for example, when the arrangement instruction "E-c" is added as illustrated in FIG. 25(a), the arrangement instruction "G-c" having the duplicated area and the arrangement instruction "E-a" having the duplicated content are deleted as illustrated in FIG. 25(b). Then, as illustrated in FIG. 25(c), the arrangement instructions "G-c" and "E-a" are stored in the instruction history group.

At S480, the contents are assigned to the areas based on the effective instruction group. This achieves "late-come-win arrangement" in arranging the content to the area.

At subsequent S490, it is determined whether or not the instruction history group contains an arrangement instruction that is not duplicated with the effective instruction group. It happens that when a new arrangement instruction is added to the effective instruction group, the arrangement instruction deleted in past may not be duplicated with the effective instruction group. When the instruction history group contains a non-duplicated arrangement instruction (S490: YES), a content is arranged on an area based on the arrangement instruction in the instruction history group at S500, and the process proceeds to S510 in FIG. 23. When the instruction history group does not contain a non-duplicated arrangement instruction (S490: NO), the process proceeds to S510 in FIG. 23 without execution of S500.

Figure 28:
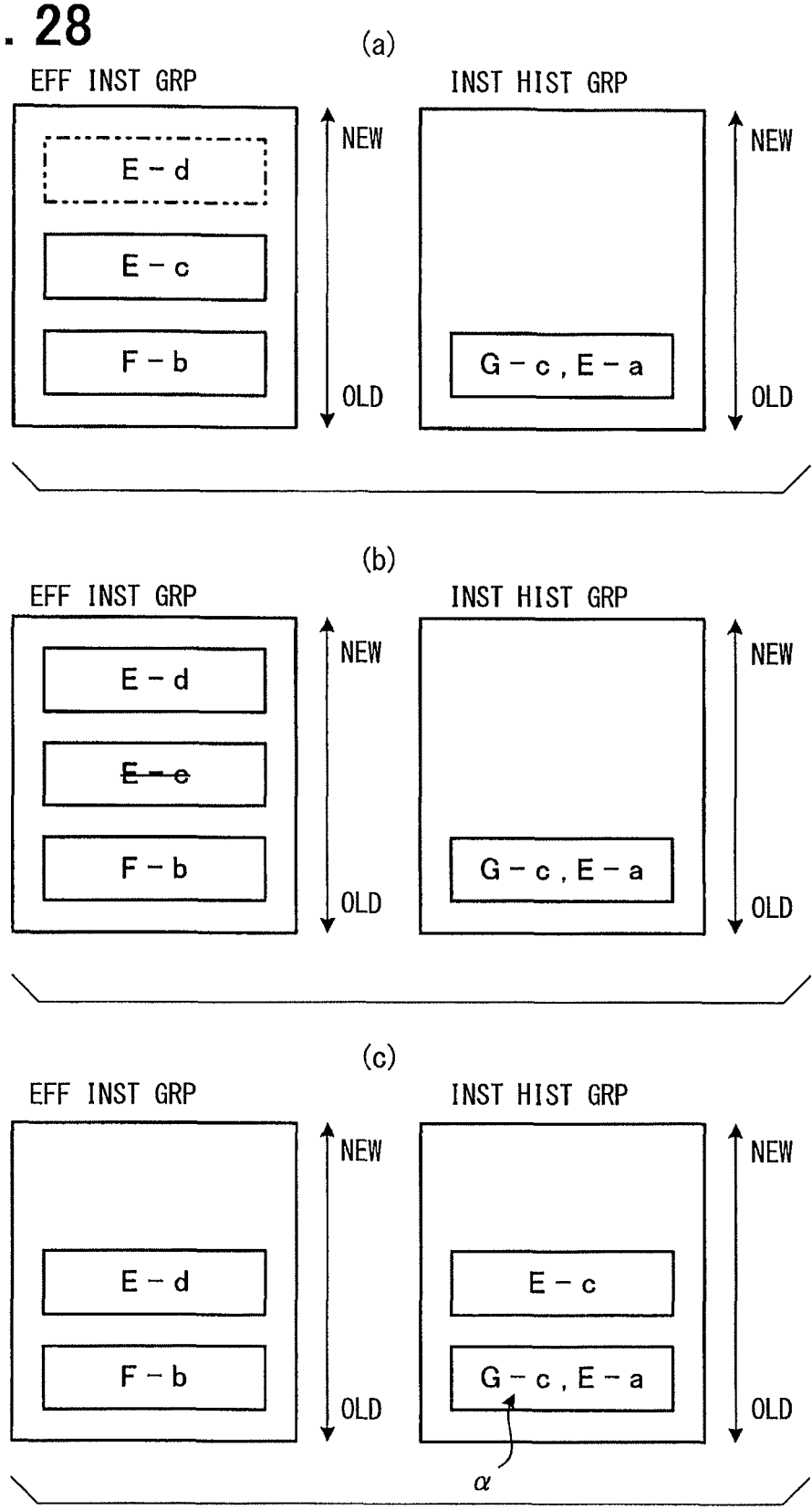
FIG. 28(a) is an explanatory diagram illustrating addition of an arrangement instruction to an effective instruction group.
FIG. 28(b) is an explanatory diagram illustrating deletion of arrangement instruction duplication, and d
FIG. 28(c) is an explanatory diagram illustrating addition of a deleted arrangement instruction to an instruction history group.

For example, as illustrated in FIG. 28(a), suppose that an arrangement instruction "E-d" is newly added to the effective instruction group in a situation where arrangement instructions "G-c" and "E-a" are stored in the instruction history group. In this case, the duplicated arrangement instruction "E-c" is deleted as illustrated in FIG. 28(b) and the arrangement instruction "E-c" is added to the instruction history group (S470) as illustrated in FIG. 28(c). In the above, the arrangement instruction "G-c" (denoted by the symbol "α") in the instruction history group becomes not duplicated with the arrangement instructions in the effective instruction group (S490: YES), and the content G is assigned to the area c based on the arrangement instruction "G-c" (S500).

At S510 in FIG. 23, a content list is generated. This process generates a list of contents that have not yet been assigned to areas before S500. Specifically, the contents having "active state" as their attributes are extracted and sorted in a descending order of information value. For example, suppose that contents X, Y, Z, and W are present and their information value is X>Y>Z>W. In this case, when the contents X Z, W are in the active state, the content list "X→Z→W" is generated. Now, it is assumed here that the total number of contents stored is N.

At subsequent S520, a variable n indicating the content is initialized to "1." As the variable n is incremented, the processing is performed in the following order: the 1st content in the m-th combination→the 2nd content in the m-th combination→the 3rd content in the m-th combination and so on.

At subsequent S530, an area search is made. This process searches for all areas to which contents have not yet been assigned.

At S540, an area is excluded based on the hierarchical data structure. This process excludes a certain area that is assigned no content but a content is assigned to an area located higher than the certain area in the hierarchical data structure. As illustrated in FIG. 19(c), for example, when a content is assigned to the area b, the areas d and e are excluded.

At S550, an area is excluded based on the content size and the area size. The process excludes an area whose area size is smaller than the content size of a content to be assigned.

At S560, an area is excluded based on assignment management. Specifically, this process excludes an area having no correspondence relationship with the content, based on the correspondence relationship stored in the assignment management portion 13.

At S570, evaluation values are calculated and an area having the largest evaluation value is selected. This process uses a predetermined calculation expression to calculate evaluation values and selects an area having the largest evaluation value.

Specifically, the evaluation value includes a driver evaluation value (DE), a front-seat passenger evaluation value (AE), and a rear-seat passenger evaluation value (RE). To simplify equations, the driver is expressed as "D," the front-seat passenger as "A," and the rear-seat passenger as "R." The present embodiment defines the evaluation values as follows.

$$DE = K[D] \times \text{information value } [D] \times \text{area suitability } [D]$$

$$AE = K[A] \times \text{information value } [A] \times \text{area suitability } [A]$$

$$RE = K[R] \times \text{information value } [R] \times \text{area suitability } [R]$$

In these equations, K[D], K[A], and K[R] denote the presence of a driver, the presence of a front-seat passenger, and the presence of a rear-seat passenger, respectively, and are set to "1" when they are aboard or to "0" otherwise.

The evaluation value to be obtained is expressed as follows.

$$\text{evaluation value} = DE + AE + RE$$

At S580, assignment of the content to the area having the largest evaluation value provided at S570 is stored.

At S590, it is determined whether the variable n equals the number N of contents. This process determines whether all of contents included in the m-th combination have been processed already. If the determination results in n=N (S590: YES), the process proceeds to S610 in FIG. 24. If the determination results in n≠N (S590: NO), an unprocessed content remains. The process increments the variable n at S600 and repeats from S530.

At S610 in FIG. 24, it is determined whether the variable m equals the number M of combinations. This process determines whether all of combinations have been processed already. If the determination results in m=M (S610: YES), the process proceeds to S620. If the determination results in m≠M (S610: NO), an unprocessed combination remains. The process increments the variable m at S630 and repeats from S470 in FIG. 22.

At S620, it is determined whether or not there is a combination satisfying the indispensable exclusive constraint equation. For example, because the content A or B of the above-illustrated contents is a content to be indispensably displayed, it is determined whether or not there is a combination for assigning the content A or B to areas. When it is determined that there is a combination satisfying the indispensable exclusive constraint equation (S620: YES), the process proceeds to S640. When it is determined that there is no combination satisfying the indispensable exclusive constraint equation (S620: NO), the old arrangement instruction is deleted from the effective instruction group at S650, and the process proceeds to S460 in FIG. 22.

At S640, the combination having the largest total of evaluation values is selected based on the total of evaluation values of each combination. This fixes assignment of the contents stored at S580 in FIG. 23 to areas. At subsequent S660, the effective instruction group and the instruction history group are fixed.

At S670, it is determined whether the variable I equals the number of ruling-sets L. This process determines whether all lists are processed. If I=L (YES at S670), the process proceeds to S680. If I≠L (NO at S670), that is, if an unprocessed ruling-set remains, the variable I is incremented at S690 and the process is repeated from S440 in FIG. 22.

At S680, the contents are displayed. This process displays the contents on the assigned areas and is implemented as a function of the display layout control portion 16.

Figure 29:
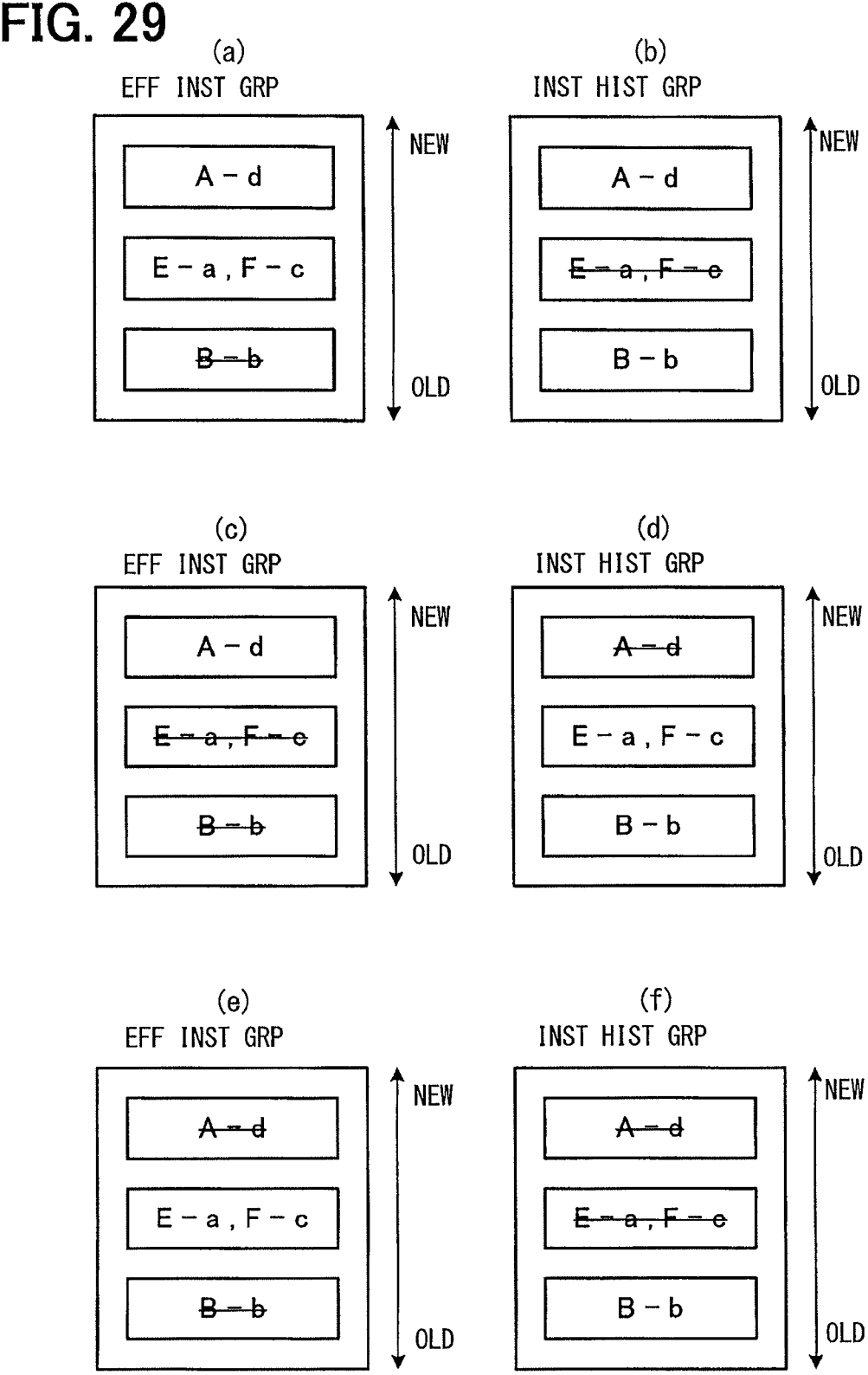
FIGS. 29(a), 29(b) and 29(c) are explanatory diagrams illustrating deletion of an arrangement instruction from an effective instruction group.

In the display control process, if there is no combination satisfying the indispensable exclusive constraint equation (S620: NO), the old instruction is deleted from the effective instruction group (S650) and the processing on all the combinations is performed again. An example of deleting the arrangement instruction from the effective instruction group is illustrated in FIG. 29.

As illustrated in FIG. 29(a), the oldest arrangement instruction "B-b" is deleted first (S650), and the processing on all the combinations is performed again. When there is still no combination satisfying the indispensable exclusive constraint equation (S620: NO), the second oldest arrangement instruction "E-a, F-c" is deleted next (S650), as illustrated in FIG. 29(b).

When there is still yet no combination satisfying the indispensable exclusive constraint equation (S620: NO), the arrangement instructions "E-b", "E-a, F-c" are deleted (S650), as illustrated in FIG. 29(c). Each time when the determination at S620 is negative, the deletion of the arrangement instruction is performed for "A-d" (FIG. 29(d))→"A-d", "B-b" (FIG. 29(e))→"A-d", "E-a, F-c" (FIG. 29(f)) and so on.

This precisely corresponds to an increase in digit number of binary number described as "001"→"010"→"011"→"100"→"101"→"110". In the above, "1" corresponds to the deleted arrangement instruction. A newer arrangement instruction corresponds to a left-side digit.

This is because it is desirable that a combination satisfying the indispensable exclusive constraint equation can provide arrangement instructions included in the effective instruction group.

Technical effects provided by the display control apparatus 1 of the present embodiment will be described.

There is a demand that two contents are displayed, for example, in a side by side manner or an overlapped manner when the two contents are related to each other. For example, assume a demand to pop up a content C on a content A. In this case, a system may issue an arrangement instruction for the content C but the area for the content C may be determined only after the area for the content A is determined.

In this regard, the present embodiment is capable of issuing an arrangement instruction to arrange a specific content on a virtual area. After assignment of a related content, which is related to the specific content, to areas is determined, associating the virtual area with an actual area is performed (see S440 in FIG. 22, FIG. 21(c), and FIG. 26). Specifically, the arrangement instructions including an arrangement instruction to arrange on a virtual area are employed. A related content, which is related to a content of an arrangement instruction, is assigned to areas, and then, associating the virtual area with an actual area is performed. This enables contents to be arranged in a side-by-side manner or an overlapped manner when the contents have a relationship therebetween.

Furthermore, in the present embodiment, the contents and the areas are grouped on a ruling-set basis, and the assignment is performed on the ruling-set basis (see FIG. 21(b)). Specifically, the content assignment portion 15b (corresponding to a content assignment means) groups the contents and the areas on a ruling-set basis, and performs the assignment on the ruling-set basis. Because of this, it becomes relatively easy to designate an order of assignment of contents or areas.

Some contents are required to be indispensably displayed. Some contents are required to be exclusively displayed. For example, in the case of "vehicle speed", at least one of analog display (meter display) and digital display (numeric display) is indispensable.

In view of this, the assignment management portion 13 of the present embodiment stores the indispensable exclusive constraint equation, which indicates an indispensable exclusive relationship of areas and contents using the predetermined operators. The process with this indispensable exclusive constraint equation is performed (S450 in FIG. 22), and it is determined whether there is a combination satisfying the indispensable exclusive constraint equation (S620 in FIG. 24), and the contents are assigned to the areas (S480, S500 in FIG. 22). Specifically, in the present embodiment, the assignment management portion 13 stores content information that defines the indispensable exclusive relationship of contents. The content assignment portion 15b assigns the contents to the areas based on the content information stored in the assignment management portion 13. In the above, the content information includes the indispensable exclusive constraint equation indicating the indispensable exclusive relationship of contents using the predetermined operators. The content assignment portion 15b assigns the contents to the areas so that the indispensable exclusive constraint equation is satisfied. Additionally, in the present embodiment, the assignment management portion 13 stores area information that defines the indispensable exclusive relationship of areas. The content assignment portion 15b assigns the contents to the areas based on the area information stored in the assignment management portion 13. In the above, the area information includes the indispensable exclusive constraint equation indicating the indispensable exclusive relationship of areas using the predetermined operators. The content assignment portion 15b assigns the contents to the areas so that the indispensable exclusive constraint equation is satisfied. This makes it possible to assign contents to areas by reflecting the indispensable exclusive relationships among contents and areas. The information can be displayed more appropriately.

When there is no combination satisfying the indispensable exclusive constraint equation (S620: NO in FIG. 24), part of the assignment instructions is deleted from the effective instruction group (S650), and the assignment of contents to areas is performed again (S480, S500 in FIG. 22). Specifically, when the assignment of contents to areas with satisfaction of the content information and the area information is impossible, the content assignment portion 15b deletes part of the arrangement instructions stored in the arrangement instruction storage 15a (arrangement instruction storage means) and performs the assignment of contents to areas again. In this way, the content to be indispensably displayed can be surely displayed.

As for a content for which the arrangement instruction is absent, the assignment of the content to an area is performed based on the information value of the content and the area suitability of the area. Specifically, the content management portion 11 manages content in association with the information value, which is the value of information for each target viewer. The area management portion 12 manages an area in association with area suitability, which is positional suitability of the area. The assignment control portion 15 determines the assignment of a content to an area by using an evaluation value that is based on the information value and the area suitability (S510 to S600 in FIGS. 23 and S640 in FIG. 24). Specifically, the content management portion 11 manages contents in association with the information value indicating the value of information. The area management portion 12 manages areas in association with the area suitability indicating the positional suitability. The content assignment portion 15b assigns the content, for which the arrangement instruction is absent, to the area based on the information value and the area suitability. Therefore, because the content without having the arrangement instruction is assigned to an area based on the information value and the area suitability, the information can be displayed in a manner that facilitates user understanding.

Furthermore, in the present embodiment, various contents can be acquired via an in-vehicle network (see FIG. 17). Specifically, the content management portion 11 acquires a content from the in-vehicle network. Additionally, the content management portion 11 may acquire a content from a newly-connected external apparatus. The content management portion 11 equally manages various contents by associating the contents with the information values, the content sizes and the display states (see FIG. 18). This enables the use of the same algorithm to assign contents to areas regardless of contents types.

Similarly, the present embodiment associates "area suitability" and "area size" with multiple areas of the display apparatus 21 to 23 to manage the areas (see FIG. 18). In other words, the area management portion 12 manages the multiple display apparatuses 21, 22, 23 in terms of areas. This enables the use of the same algorithm to determine an area to which a content is to be assigned even if the display apparatuses 21 to 23 are different apparatus.

Embodiments of the present disclosure are limited to the above-illustrated embodiments and include various embodiments.

As described above, when contents and areas are managed only according to their attributes, the same algorithm can be used to assign contents to areas regardless of content types and regardless of distinction among the display apparatuses 21 to 23. Therefore, if any one of the first, second and third display apparatus 21 to 23 fails for example, the above-mentioned embodiments allows the area management portion 12 to update the management information and to enable assignment of contents to areas without changing the algorithm. Similarly, it is easy to additionally connect a fourth display apparatus 50 as illustrated in FIG. 17. Also in this case, the area management portion 12 may update the management information to conform to the fourth display apparatus 50. The fourth display apparatus 50 may be a cellular phone such as a smartphone, an information terminal called a PDA, or the like. In this case, information on areas may be acquired from the fourth display apparatus 50 itself. The area management portion 12 may update the areas to be managed, when part of the display apparatuses 21, 22, 23, 50 are attached or detached.

The above-described embodiment calculates the evaluation value based on the information value of a content and the area suitability of an area. Additionally, an eye gaze characteristic, an expressiveness characteristic, an operation characteristic and the like may be employed as an information characteristic of a content and an area characteristic of an area.

The above-described embodiment calculates evaluation values for all combinations of contents and areas. However, possible combinations of only particular contents and particular areas may be acquired and evaluation values of the possible combinations may be acquired. Then, based on the acquired evaluation values, a combination of contents and areas may be determined.

In the above-described embodiment, combinations of contents and areas are extracted as lists. However, the combinations may not be extracted as list-type data structures and may be defined by variables such pointers.

According the present disclosure, a display control apparatus can be provided in various modes.

For example, according to one mode of the present disclosure, a display control apparatus performing a predetermined comparison operation on display images to automatically assign the display images to a plurality of areas configured as display regions on a screen of a display mounted to a vehicle is provided. The display control apparatus comprises an area relationship information storage, a display image relationship information storage, an image determination portion, and a display image assignment portion. The area relationship information storage stores area relationship information for each of the areas, wherein the area relationship information for each area has information on another area that is closely related to the each area. The display image relationship information storage stores image relationship information for each of the display images, wherein the image relationship information for each display image has information on another display image that is closely related to the each display image. The image determination portion determines that, of two display images related to each other, one of the two display images belongs to a first image group and the other belongs to a second image group different from the first image group.

The display image assignment portion assigns the display image determined as belonging to the first image group to the areas by performing the predetermined comparison operation, and then assigns the display image determined as belonging to the second image group to the areas based on the area to which the display image determined as belonging to the first image group is assigned, and based on the information stored in the area relationship information storage.

The above display control apparatus may further comprise an arrangement instruction management portion storing arrangement instructions each generated by a user operation or a system request, the arrangement instructions being instructions for arranging the display images to the areas. As the predetermined comparison operation, the display image assignment portion may perform display mediation based on the arrangement instructions (S130 to S160).

The above display control apparatus may further comprise: an area information management portion storing area suitabilities in association with the areas, each area suitability being suitability for assignment of a display image to an area; and a display image management portion storing information values in association with the display images, each information value indicating value of display of a display image. As the predetermined comparison operation, the display image assignment portion may perform display mediation based on the area suitabilities and the information values (S230, S240, S270).

In the above display control apparatus, the display may be provided by a plurality of display apparatuses. The area information management portion may manage the plurality of display apparatuses on an area-to-area basis.

In the above display control apparatus, the area information management portion may update the information on the areas when part of the plurality of display apparatuses is detached.

In the above display control apparatus, the area relationship information storage updates the area relationship information when part of the display is detached.

In the above display control apparatus, the display image management portion may manage the display images that are based on information acquired via an in-vehicle network.

In the above display control apparatus, the display image management portion may update the information on the display images when part of external apparatuses is detached.

In the above display control apparatus, the display image relationship information storage may update the image relationship information when part of external apparatuses is detached.

Furthermore, according to the present disclosure, a display image assignment method for performing a predetermined comparison operation to automatically assign a plurality of a display images to a plurality of display areas provided by a display mounted to a vehicle is provided. The display image assignment method comprises: for each of two display image related to each other among the plurality of display images, determining whether the display image belongs to a first group and whether the display image belongs to a second group different from the first group; assigning the display image determined as belonging to the first group to the display areas by performing the comparison operation; and based on a result of the assigning the display image of the first group and based on a relationship of the display areas, assigning the display image determined as belonging to the second group to an display area that is related to the display image belonging to the first group.

In the above display control apparatus and the above display image assignment method performing a predetermined comparison operation on a pluralityy of display images to automatically assign the display images to areas configured in a vehicular display, when multiple display images have a relationship therebetween, the display images can be displayed in a manner that facilitates user understanding the relationship of the display images.

Although embodiments, configurations, and modes have been illustrated in the above, the present disclosure is not limited to the above-mentioned embodiments, configurations, and modes. The technical scope of the disclosure also includes embodiments, configurations, and modes that may result from an appropriate combination of the technical portions disclosed in different embodiments, configurations, and modes.

The invention claimed is:

1. A display control apparatus performing a predetermined comparison operation on display images to automatically assign the display images to a plurality of areas configured as display regions on a screen of a display mounted to a vehicle, the display control apparatus comprising:
a processor, the processor is configured to
store, by an area relationship information storage, area relationship information for each of the areas, wherein the area relationship information for each area has information on another area that is closely related to the each area;
store, by a display image relationship information storage, image relationship information for each of the display images, wherein the image relationship information for each display image has information on another display image that is closely related to the each display image;
determine, by an image determination portion, that, of two display images related to each other, one of the two display images belongs to a first image group and the other belongs to a second image group different from the first image group; and
assign, by a display image assignment portion, the display image determined as belonging to the first image group to an area by performing the predetermined comparison operation,
and then superimpose, by the display image assignment portion, the display image determined as belonging to the second image group on the display image determined as belonging to the first image group by assigning the display image determined as belonging to the second image group to an area that is superimposed on the area to which the display image determined as belonging to the first image group is assigned, based on the area to which the display image determined as belonging to the first image group is assigned, and based on the information stored in the area relationship information storage, wherein:
the image relationship information is link information that links the closely-related display images and that is defined independently of the areas;
the area relationship information is link information that links the closely-related areas and that is defined independently of the display images;
the areas linked by the area relationship information for a first area is the first area and a second area superimposed on the first area;

the areas not linked by the area relationship information for the first area include the first area and a third area separated from the first area; and the image relationship information further stores ruling-set numbers for determining that, of two display images closely related to each other in the image relationship information, a first display image belongs to the first image group and the second display image belongs to the second image group different from the first image group; and when the image determination portion determines based on the image relationship information and the ruling-set numbers that the first and second display images are closely related to each other and belong to the first and second image groups respectively, the display image assignment portion is further configured to assign the first display image to the first area by performing the predetermined comparison operation, and then superimpose the second display image on the first display image by assigning the second display image not to the third area separated from the first area but to the second area superimposed on the first area based on the area relationship information and based on the first area to which the first display image is assigned.

2. The display control apparatus according to claim 1, wherein the processor is further configured to:

store, by an arrangement instruction management portion, arrangement instructions each generated by a user operation or a system request, the arrangement instructions being instructions to arrange the display images to the areas, wherein:

as the predetermined comparison operation, perform, by the display image assignment portion, display mediation based on the arrangement instructions.

3. The display control apparatus according to claim 1, wherein the processor is further configured to:

store, by an area information management portion, area suitabilities in association with the areas, each area suitability being suitability for assignment of a display image to an area; and store, by a display image management portion, information values in association with the display images, each information value indicating value of display of a display image, wherein:

as the predetermined comparison operation, perform, by the display image assignment portion, display mediation based on the area suitabilities and the information values.

4. The display control apparatus according to claim 3, wherein:

the display is provided by a plurality of display apparatuses; and the processor is further configured to manage, by the area information management portion, the plurality of display apparatuses on an area-to-area basis.

5. The display control apparatus according to claim 4, wherein:

the processor is further configured to update, by the area information management portion, the information on the areas when part of the plurality of display apparatuses is detached.

6. The display control apparatus according to claim 1, wherein:

the processor is further configured to update, by the area relationship information storage, the area relationship information when part of the display is detached.

7. The display control apparatus according to claim 3, wherein:

the processor is further configured to manage, by the display image management portion, the display images that are based on information acquired via an in-vehicle network.

8. The display control apparatus according to claim 7, wherein:

the processor is further configured to update, by the display image management portion, the information on the display images when part of external apparatuses is detached.

9. The display control apparatus according to claim 1, wherein:

the processor is further configured to update, by the display image relationship information storage, the image relationship information when part of external apparatuses is detached.

10. A display image assignment method for performing a predetermined comparison operation to automatically assign a plurality of a display images to a plurality of display areas provided by a display mounted to a vehicle, the display image assignment method comprising:

for each of two display image related to each other among the plurality of display images, determining, by a processor, whether the display image belongs to a first group and whether the display image belongs to a second group different from the first group;

assigning, by the processor, the display image determined as belonging to the first group to a display area by performing the predetermined comparison operation; and superimposing, by the processor, the display image determined as belonging to the second image group on the display image determined as belonging to the first image group, based on a result of the assigning the display image of the first group and based on a relationship of the display areas, by assigning the display image determined as belonging to the second group to a display area that is superimposed on the area to which the display image determined as belonging to the first image group is assigned, that is related to the display image belonging to the first group, wherein:

the image relationship information is link information that links the closely-related display images and that is defined independently of the areas;

the area relationship information is link information that links the closely-related areas and that is defined independently of the display images;

the areas linked by the area relationship information for a first area is the first area and a second area superimposed on the first area;

the areas not linked by the area relationship information for the first area include the first area and a third area separated from the first area; and the image relationship information further stores ruling-set numbers for determining that, of two display images closely related to each other in the image relationship information, a first display image belongs to the first image group and the second display image belongs to the second image group different from the first image group; and when the processor determines based on the image relationship information and the ruling-set numbers that the first and second display images are closely related to each other and belong to the first and second image groups respectively, the processor is further configured to assign the first display image to the first area by performing the predetermined comparison operation, and then superimpose the second display image on the first display image by assigning the second display image not to the third area separated from the first area but to the second area superimposed on the first area based on the area relationship information and based on the first area to which the first display image is assigned.

11. The display control apparatus according to claim 1, wherein:

the display image which belongs to the second image group, and which is superimposed on the display image which belongs to the first image group, is superimposed as a pop up within the area to which the display image of the first image group is assigned.

12. The display image assignment method according to claim 10, wherein:

the display image which belongs to the second image group, and which is superimposed on the display image which belongs to the first image group, is superimposed as a pop up within the area to which the display image of the first image group is assigned.

13. The display control apparatus according to claim 12, wherein the display image management portion updates the information on the display images when part of external apparatuses is detached.

* * * * *